US011774233B2

(12) United States Patent
Goers et al.

(10) Patent No.: US 11,774,233 B2
(45) Date of Patent: Oct. 3, 2023

(54) METHOD AND SYSTEM FOR MEASURING GEOMETRIC PARAMETERS OF THROUGH HOLES

(71) Applicant: CORNING INCORPORATED, Corning, NY (US)

(72) Inventors: Uta-Barbara Goers, Campbell, NY (US); Robert Wendell Sharps, Corning, NY (US)

(73) Assignee: Corning Incorporated, Corning, NY (US)

( * ) Notice: Subject to any disclaimer, the term of this patent is extended or adjusted under 35 U.S.C. 154(b) by 297 days.

(21) Appl. No.: 17/004,092

(22) Filed: Aug. 27, 2020

(65) Prior Publication Data

US 2020/0393233 A1    Dec. 17, 2020

Related U.S. Application Data

(63) Continuation of application No. 15/632,919, filed on Jun. 26, 2017, now Pat. No. 10,794,679.

(60) Provisional application No. 62/356,091, filed on Jun. 29, 2016.

(51) Int. Cl.
| | |
|---|---|
| *G01B 7/12* | (2006.01) |
| *G01B 11/12* | (2006.01) |
| *G01B 7/13* | (2006.01) |
| *G01B 11/08* | (2006.01) |
| *B60R 1/12* | (2006.01) |

(52) U.S. Cl.
CPC .................. *G01B 7/12* (2013.01); *G01B 7/13* (2013.01); *G01B 11/12* (2013.01); *B60R 2001/1253* (2013.01); *G01B 11/08* (2013.01); *G06T 2207/10028* (2013.01)

(58) Field of Classification Search
CPC . G01B 7/12; G01B 7/13; G01B 11/12; G01B 11/08; G06T 2207/10028; B60R 2001/1253
See application file for complete search history.

(56) References Cited

U.S. PATENT DOCUMENTS

| | | |
|---|---|---|
| 108,387 A | 10/1870 | Pike |
| 208,387 A | 9/1878 | Geoege |
| 237,571 A | 2/1881 | Messier |
| 1,790,397 A | 1/1931 | Woods et al. |
| 2,682,134 A | 6/1954 | Stookey |
| 2,749,794 A | 6/1956 | O'Leary |
| 3,647,410 A | 3/1972 | Heaton et al. |

(Continued)

FOREIGN PATENT DOCUMENTS

| | | |
|---|---|---|
| AU | 2004276725 A1 | 4/2005 |
| AU | 2011101310 A4 | 11/2011 |

(Continued)

OTHER PUBLICATIONS

Taiwanese Patent Application No. 107117314, Office Action, dated Aug. 16, 2022, 1 page; Taiwanese Patent Office.

(Continued)

*Primary Examiner* — Jonathan M Dunlap
(74) *Attorney, Agent, or Firm* — Amy T. Lang

(57) ABSTRACT

A method of measuring geometric parameters of through holes in a thin substrate includes acquiring images of select sub-volumes of the substrate using an optical system having a field of depth greater than a thickness of the substrate. The acquired images are processed to determine the desired geometric parameters.

16 Claims, 6 Drawing Sheets

(56) References Cited

U.S. PATENT DOCUMENTS

| | | |
|---|---|---|
| 3,695,497 A | 10/1972 | Dear |
| 3,695,498 A | 10/1972 | Dear |
| 3,713,921 A | 1/1973 | Fleischer et al. |
| 3,729,302 A | 4/1973 | Heaton |
| 3,775,084 A | 11/1973 | Heaton |
| 3,798,013 A | 3/1974 | Hasegawa et al. |
| 4,226,607 A | 10/1980 | Domken |
| 4,395,271 A | 7/1983 | Beall et al. |
| 4,441,008 A | 4/1984 | Chan |
| 4,546,231 A | 10/1985 | Gresser et al. |
| 4,547,836 A | 10/1985 | Anthony |
| 4,564,579 A | 1/1986 | Morita et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 4,948,941 A | 8/1990 | Altman et al. |
| 5,022,959 A | 6/1991 | Itoh et al. |
| 5,035,918 A | 7/1991 | Vyas |
| 5,040,182 A | 8/1991 | Spinelli et al. |
| 5,089,062 A | 2/1992 | Pavlik et al. |
| 5,102,498 A | 4/1992 | Itoh et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,166,493 A | 11/1992 | Inagawa et al. |
| 5,208,068 A | 5/1993 | Davis et al. |
| 5,265,107 A | 11/1993 | Delfyett, Jr. |
| 5,314,522 A | 5/1994 | Kondo et al. |
| 5,374,291 A | 12/1994 | Yabe et al. |
| 5,400,350 A | 3/1995 | Galvanauskas |
| 5,434,875 A | 7/1995 | Rieger et al. |
| 5,436,925 A | 7/1995 | Lin et al. |
| 5,457,836 A | 10/1995 | Wiedeck |
| 5,493,096 A | 2/1996 | Koh |
| 5,553,093 A | 9/1996 | Ramaswamy et al. |
| 5,574,597 A | 11/1996 | Kataoka |
| 5,575,291 A | 11/1996 | Hayakawa et al. |
| 5,575,936 A | 11/1996 | Goldfarb |
| 5,586,138 A | 12/1996 | Yokoyama |
| 5,696,782 A | 12/1997 | Harter et al. |
| 5,736,709 A | 4/1998 | Neiheisel |
| 5,745,236 A | 4/1998 | Haga |
| 5,746,884 A | 5/1998 | Gupta et al. |
| 5,776,220 A | 7/1998 | Allaire et al. |
| 5,844,200 A | 11/1998 | Leader et al. |
| 5,879,424 A | 3/1999 | Nishii et al. |
| 5,909,284 A | 6/1999 | Nakamura |
| 5,919,607 A | 7/1999 | Lawandy |
| 5,933,230 A | 8/1999 | Imaino et al. |
| 5,965,043 A | 10/1999 | Noddin et al. |
| 6,016,223 A | 1/2000 | Suzuki et al. |
| 6,016,324 A | 1/2000 | Rieger et al. |
| 6,055,829 A | 5/2000 | Witzmann et al. |
| 6,072,624 A | 6/2000 | Dixon et al. |
| 6,078,599 A | 6/2000 | Everage et al. |
| 6,120,131 A | 9/2000 | Murthy et al. |
| 6,140,243 A | 10/2000 | Wallace et al. |
| 6,143,382 A | 11/2000 | Koyama et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,224,713 B1 | 4/2001 | Hembree et al. |
| 6,234,755 B1 | 5/2001 | Bunker et al. |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,308,055 B1 | 10/2001 | Welland et al. |
| 6,319,867 B1 | 11/2001 | Chacon et al. |
| 6,322,958 B1 | 11/2001 | Hayashi |
| 6,338,901 B1 | 1/2002 | Veerasamy |
| 6,339,208 B1 | 1/2002 | Rockstroh et al. |
| 6,344,242 B1 | 2/2002 | Stolk et al. |
| 6,373,565 B1 | 4/2002 | Kafka et al. |
| 6,381,391 B1 | 4/2002 | Islam et al. |
| 6,391,213 B1 | 5/2002 | Homola |
| 6,396,856 B1 | 5/2002 | Sucha et al. |
| 6,399,914 B1 | 6/2002 | Troitski |
| 6,407,360 B1 | 6/2002 | Choo et al. |
| 6,420,088 B1 | 7/2002 | Angelopoulos et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,537,937 B1 | 3/2003 | Nishizawa et al. |
| 6,552,301 B2 | 4/2003 | Herman et al. |
| 6,563,079 B1 | 5/2003 | Umetsu et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,737,345 B1 | 5/2004 | Lin et al. |
| 6,744,009 B1 | 6/2004 | Xuan et al. |
| 6,754,429 B2 | 6/2004 | Borrelli et al. |
| 6,787,732 B1 | 9/2004 | Xuan et al. |
| 6,794,605 B2 | 9/2004 | Park et al. |
| 6,800,237 B1 | 10/2004 | Yamamoto et al. |
| 6,800,831 B1 | 10/2004 | Hoetzel |
| 6,906,795 B2 | 6/2005 | Goto et al. |
| 6,958,094 B2 | 10/2005 | Ohmi et al. |
| 6,990,285 B2 | 1/2006 | Schroeder et al. |
| 6,992,026 B2 | 1/2006 | Fukuyo et al. |
| 6,992,030 B2 | 1/2006 | Paulson |
| 7,008,817 B2 | 3/2006 | Kim et al. |
| 7,009,138 B2 | 3/2006 | Amako et al. |
| 7,019,257 B2 | 3/2006 | Stevens |
| 7,033,519 B2 | 4/2006 | Taylor et al. |
| 7,043,072 B2 | 5/2006 | Goto et al. |
| 7,057,135 B2 | 6/2006 | Li |
| 7,084,073 B2 | 7/2006 | Lee et al. |
| 7,211,899 B2 | 5/2007 | Taniguchi et al. |
| 7,337,540 B2 | 3/2008 | Kurosawa |
| 7,353,829 B1 | 4/2008 | Wachter et al. |
| 7,407,889 B2 | 8/2008 | Tsunetomo et al. |
| 7,511,886 B2 | 3/2009 | Schultz et al. |
| 7,528,967 B2 | 5/2009 | Okawauchi et al. |
| 7,534,734 B2 | 5/2009 | Ellison |
| 7,535,634 B1 | 5/2009 | Savchenkov et al. |
| 7,626,665 B2 | 12/2009 | Koike |
| 7,633,033 B2 | 12/2009 | Thomas et al. |
| 7,642,483 B2 | 1/2010 | You et al. |
| 7,649,153 B2 | 1/2010 | Haight et al. |
| 7,683,370 B2 | 3/2010 | Kugimiya et al. |
| 7,726,532 B2 | 5/2010 | Gonoe |
| 7,749,809 B2 | 7/2010 | How et al. |
| 7,763,559 B2 | 7/2010 | Kurachi et al. |
| 7,772,115 B2 | 8/2010 | Hiatt |
| 7,777,275 B2 | 8/2010 | Lee |
| 7,836,727 B2 | 11/2010 | Nishiyama |
| 7,880,117 B2 | 1/2011 | Li et al. |
| 7,981,810 B1 | 7/2011 | Subramonium et al. |
| 7,994,503 B2 | 8/2011 | Hino et al. |
| 8,007,913 B2 | 8/2011 | Coppola et al. |
| 8,021,950 B1 | 9/2011 | Abadeer et al. |
| 8,104,385 B2 | 1/2012 | Hayashi et al. |
| 8,118,971 B2 | 2/2012 | Hori et al. |
| 8,119,462 B2 | 2/2012 | Takasawa et al. |
| 8,132,427 B2 | 3/2012 | Brown et al. |
| 8,163,649 B2 | 4/2012 | Koike et al. |
| 8,168,514 B2 | 4/2012 | Garner et al. |
| 8,245,539 B2 | 8/2012 | Lu et al. |
| 8,245,540 B2 | 8/2012 | Abramov et al. |
| 8,257,603 B2 | 9/2012 | Logunov et al. |
| 8,269,138 B2 | 9/2012 | Garner et al. |

(56) References Cited

U.S. PATENT DOCUMENTS

| | | |
|---|---|---|
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,303,754 B2 | 11/2012 | Higuchi |
| 8,307,672 B2 | 11/2012 | Hidaka et al. |
| 8,327,666 B2 | 12/2012 | Harvey et al. |
| 8,338,957 B2 | 12/2012 | Nilsson |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,384,083 B2 | 2/2013 | Mori et al. |
| 8,411,459 B2 | 4/2013 | Yu et al. |
| 8,444,906 B2 | 5/2013 | Lee et al. |
| 8,448,471 B2 | 5/2013 | Kumatani et al. |
| 8,455,378 B2 | 6/2013 | Yanase et al. |
| 8,482,189 B2 | 7/2013 | Goto et al. |
| 8,518,280 B2 | 8/2013 | Hsu et al. |
| 8,531,679 B2 | 9/2013 | Scheiner |
| 8,533,942 B2 | 9/2013 | Ohashi et al. |
| 8,535,997 B2 | 9/2013 | Kawakami et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,643,129 B2 | 2/2014 | Laming et al. |
| 8,670,182 B2 | 3/2014 | Tanida et al. |
| 8,680,489 B2 | 3/2014 | Martinez et al. |
| 8,685,838 B2 | 3/2014 | Fukuyo et al. |
| 8,697,228 B2 | 4/2014 | Carre et al. |
| 8,699,037 B2 | 4/2014 | Cox |
| 8,720,228 B2 | 5/2014 | Li |
| 8,742,588 B2 | 6/2014 | Nilsson et al. |
| 8,796,165 B2 | 8/2014 | Ellison et al. |
| 8,826,696 B2 | 9/2014 | Brown et al. |
| 8,835,335 B2 | 9/2014 | Murata et al. |
| 8,852,698 B2 | 10/2014 | Fukumitsu |
| 8,871,641 B2 | 10/2014 | Nilsson |
| 8,873,067 B2 | 10/2014 | Lee et al. |
| 8,887,529 B2 | 11/2014 | Lu et al. |
| 8,916,798 B2 | 12/2014 | Pluss |
| 8,943,855 B2 | 2/2015 | Gomez et al. |
| 8,971,053 B2 | 3/2015 | Kariya et al. |
| 8,980,727 B1 | 3/2015 | Lei et al. |
| 8,993,465 B2 | 3/2015 | Ellison et al. |
| 8,999,179 B2 | 4/2015 | Yu et al. |
| 9,023,421 B2 | 5/2015 | Nakashima |
| 9,024,443 B2 | 5/2015 | Inaba et al. |
| 9,093,381 B2 | 7/2015 | Barriere et al. |
| 9,138,913 B2 | 9/2015 | Arai et al. |
| 9,140,539 B2 | 9/2015 | Scheiner |
| 9,227,868 B2 | 1/2016 | Matsumoto et al. |
| 9,232,652 B2 | 1/2016 | Fushie et al. |
| 9,263,300 B2 | 2/2016 | Tsai et al. |
| 9,278,886 B2 | 3/2016 | Boek et al. |
| 9,285,593 B1 | 3/2016 | Laskin et al. |
| 9,290,407 B2 | 3/2016 | Barefoot et al. |
| 9,296,066 B2 | 3/2016 | Hosseini et al. |
| 9,296,646 B2 | 3/2016 | Burket et al. |
| 9,305,470 B2 | 4/2016 | Miki et al. |
| 9,321,680 B2 | 4/2016 | Chuang et al. |
| 9,324,791 B2 | 4/2016 | Tamemoto |
| 9,327,381 B2 | 5/2016 | Lee et al. |
| 9,346,706 B2 | 5/2016 | Bazemore et al. |
| 9,377,583 B2 | 6/2016 | Giaretta et al. |
| 9,425,125 B2 | 8/2016 | Shen |
| 9,442,377 B1 | 9/2016 | Ongayi et al. |
| 9,446,590 B2 | 9/2016 | Chen et al. |
| 9,481,598 B2 | 10/2016 | Bergh et al. |
| 9,517,963 B2 | 12/2016 | Marjanovic et al. |
| 9,676,046 B2 | 6/2017 | Hamada et al. |
| 9,745,220 B2 | 8/2017 | Burket et al. |
| 9,758,876 B2 | 9/2017 | Shorey et al. |
| 9,760,986 B2 | 9/2017 | Ramamurthy et al. |
| 9,815,730 B2 | 11/2017 | Marjanovic et al. |
| 9,832,868 B1 | 11/2017 | Wright et al. |
| 9,850,160 B2 | 12/2017 | Marjanovic et al. |
| 9,953,912 B2 | 4/2018 | Goers |
| 10,144,093 B2 | 12/2018 | Marjanovic et al. |
| 10,203,476 B2 | 2/2019 | Cui |
| 2001/0009250 A1 | 7/2001 | Herman et al. |
| 2002/0005805 A1 | 1/2002 | Ogura et al. |
| 2002/0041946 A1 | 4/2002 | Abe |
| 2002/0046997 A1 | 4/2002 | Nam et al. |
| 2002/0051563 A1 | 5/2002 | Goto et al. |
| 2002/0052125 A1 | 5/2002 | Shaffer et al. |
| 2002/0062563 A1 | 5/2002 | Koide et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2002/0137344 A1 | 9/2002 | Jordan et al. |
| 2002/0180015 A1 | 12/2002 | Yamaguchi et al. |
| 2002/0182871 A1 | 12/2002 | Lu et al. |
| 2003/0006221 A1 | 1/2003 | Hong et al. |
| 2003/0007772 A1 | 1/2003 | Borrelli et al. |
| 2003/0045420 A1 | 3/2003 | Koyama et al. |
| 2003/0137056 A1 | 7/2003 | Taniguchi et al. |
| 2003/0150839 A1 | 8/2003 | Kobayashi et al. |
| 2003/0206651 A1 | 11/2003 | Goto et al. |
| 2003/0217568 A1 | 11/2003 | Koyo et al. |
| 2003/0235385 A1 | 12/2003 | Taylor et al. |
| 2004/0000534 A1 | 1/2004 | Lipinski |
| 2004/0013951 A1 | 1/2004 | Wang |
| 2004/0022487 A1 | 2/2004 | Nagasaka et al. |
| 2004/0058476 A1 | 3/2004 | Enquist et al. |
| 2004/0061705 A1 | 3/2004 | Yoon et al. |
| 2004/0092105 A1 | 5/2004 | Lee et al. |
| 2004/0094524 A1 | 5/2004 | Stevens |
| 2004/0152229 A1 | 8/2004 | Najafi et al. |
| 2004/0188393 A1 | 9/2004 | Li et al. |
| 2004/0214423 A1 | 10/2004 | Marxsen et al. |
| 2004/0217455 A1 | 11/2004 | Shiono et al. |
| 2004/0221615 A1 | 11/2004 | Postupack et al. |
| 2004/0223704 A1 | 11/2004 | Fujii et al. |
| 2004/0256619 A1 | 12/2004 | Nomura et al. |
| 2005/0009315 A1 | 1/2005 | Kim et al. |
| 2005/0023246 A1 | 2/2005 | McEntee et al. |
| 2005/0024743 A1 | 2/2005 | Camy-Peyret |
| 2005/0029238 A1 | 2/2005 | Chen |
| 2005/0033184 A1 | 2/2005 | Christoph |
| 2005/0079650 A1 | 4/2005 | Mancini et al. |
| 2005/0098458 A1 | 5/2005 | Gruetzmacher et al. |
| 2005/0098548 A1 | 5/2005 | Kobayashi et al. |
| 2005/0106874 A1 | 5/2005 | Matsui et al. |
| 2005/0112506 A1 | 5/2005 | Czech et al. |
| 2005/0115938 A1 | 6/2005 | Sawaki et al. |
| 2005/0142364 A1 | 6/2005 | Mtken |
| 2005/0142812 A1 | 6/2005 | Kurosawa |
| 2005/0158538 A1 | 7/2005 | Li et al. |
| 2005/0199592 A1 | 9/2005 | Iri et al. |
| 2005/0202683 A1 | 9/2005 | Wang et al. |
| 2005/0266320 A1 | 12/2005 | Amemiya |
| 2005/0274690 A1 | 12/2005 | Park et al. |
| 2005/0274702 A1 | 12/2005 | Deshi |
| 2006/0011593 A1 | 1/2006 | Fukuyo et al. |
| 2006/0012766 A1 | 1/2006 | Klosner et al. |
| 2006/0019814 A1 | 1/2006 | Baik et al. |
| 2006/0039160 A1 | 2/2006 | Cassarly et al. |
| 2006/0109874 A1 | 5/2006 | Shiozaki et al. |
| 2006/0127679 A1 | 6/2006 | Gulati et al. |
| 2006/0151450 A1 | 7/2006 | You et al. |
| 2006/0192978 A1 | 8/2006 | Laguarta Bertran et al. |
| 2006/0194916 A1 | 8/2006 | Zhong et al. |
| 2006/0207976 A1 | 9/2006 | Bovatsek et al. |
| 2006/0219676 A1 | 10/2006 | Taylor et al. |
| 2006/0227440 A1 | 10/2006 | Gluckstad |
| 2006/0270232 A1 | 11/2006 | Kawamura et al. |
| 2006/0289410 A1 | 12/2006 | Morita et al. |
| 2006/0290232 A1 | 12/2006 | Fujita et al. |
| 2006/0292877 A1 | 12/2006 | Lake |
| 2007/0045779 A1 | 2/2007 | Hiatt |

(56) References Cited

U.S. PATENT DOCUMENTS

| | | |
|---|---|---|
| 2007/0051706 A1 | 3/2007 | Bovatsek et al. |
| 2007/0111390 A1 | 5/2007 | Komura et al. |
| 2007/0111480 A1 | 5/2007 | Maruyama et al. |
| 2007/0117044 A1 | 5/2007 | Ogihara et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0181543 A1 | 8/2007 | Urairi et al. |
| 2007/0190340 A1 | 8/2007 | Coppola et al. |
| 2007/0202619 A1 | 8/2007 | Tamura et al. |
| 2007/0232028 A1 | 10/2007 | Lee et al. |
| 2007/0298529 A1 | 12/2007 | Maeda et al. |
| 2008/0000884 A1 | 1/2008 | Sugiura et al. |
| 2008/0099444 A1 | 4/2008 | Misawa et al. |
| 2008/0194109 A1 | 8/2008 | Ishibashi et al. |
| 2008/0206690 A1 | 8/2008 | Kennedy et al. |
| 2008/0212185 A1 | 9/2008 | Fuse |
| 2008/0245109 A1 | 10/2008 | Flemming et al. |
| 2008/0314883 A1 | 12/2008 | Juodkazis et al. |
| 2009/0013724 A1 | 1/2009 | Koyo et al. |
| 2009/0029189 A1 | 1/2009 | Moriwaki et al. |
| 2009/0032510 A1 | 2/2009 | Ando et al. |
| 2009/0075087 A1 | 3/2009 | Gu et al. |
| 2009/0098351 A1 | 4/2009 | Kishi |
| 2009/0151996 A1 | 6/2009 | Mishima et al. |
| 2009/0176034 A1 | 7/2009 | Ruuttu et al. |
| 2009/0183764 A1 | 7/2009 | Meyer |
| 2009/0219491 A1 | 9/2009 | Williams et al. |
| 2009/0242528 A1 | 9/2009 | Howerton et al. |
| 2009/0250446 A1 | 10/2009 | Sakamoto |
| 2009/0286091 A1 | 11/2009 | Danielson et al. |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0000259 A1 | 1/2010 | Ukrainczyk et al. |
| 2010/0015439 A1 | 1/2010 | Buether et al. |
| 2010/0015454 A1 | 1/2010 | Anderson et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0050692 A1 | 3/2010 | Logunov et al. |
| 2010/0068453 A1 | 3/2010 | Imai et al. |
| 2010/0080961 A1 | 3/2010 | Okamura et al. |
| 2010/0086741 A1 | 4/2010 | Bovatsek et al. |
| 2010/0086870 A1 | 4/2010 | Ogihara et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0119808 A1 | 5/2010 | Li et al. |
| 2010/0119846 A1 | 5/2010 | Sawada |
| 2010/0129603 A1 | 5/2010 | Blick et al. |
| 2010/0133697 A1 | 6/2010 | Nilsson |
| 2010/0147813 A1 | 6/2010 | Lei et al. |
| 2010/0178732 A1 | 7/2010 | Wu et al. |
| 2010/0206008 A1 | 8/2010 | Harvey et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0279509 A1 | 11/2010 | Kim et al. |
| 2010/0284027 A1 | 11/2010 | Scheiner |
| 2010/0287991 A1 | 11/2010 | Brown et al. |
| 2010/0289115 A1 | 11/2010 | Akiyama et al. |
| 2010/0289186 A1 | 11/2010 | Longo et al. |
| 2010/0291353 A1 | 11/2010 | Dejneka et al. |
| 2010/0292068 A1 | 11/2010 | Takaya et al. |
| 2010/0294748 A1 | 11/2010 | Garner et al. |
| 2010/0307809 A1 | 12/2010 | Noda et al. |
| 2010/0320179 A1 | 12/2010 | Morita et al. |
| 2010/0326138 A1 | 12/2010 | Kumatani et al. |
| 2011/0003619 A1 | 1/2011 | Fujii |
| 2011/0032467 A1 | 2/2011 | Koike |
| 2011/0045239 A1 | 2/2011 | Takaya et al. |
| 2011/0049764 A1 | 3/2011 | Lee et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0123787 A1 | 5/2011 | Tomamoto et al. |
| 2011/0132881 A1 | 6/2011 | Liu |
| 2011/0132883 A1 | 6/2011 | Sheng et al. |
| 2011/0183116 A1 | 7/2011 | Hung et al. |
| 2011/0187025 A1 | 8/2011 | Costin, Sr. |
| 2011/0189847 A1 | 8/2011 | Tsai et al. |
| 2011/0195360 A1 | 8/2011 | Flemming et al. |
| 2011/0201197 A1 | 8/2011 | Nilsson et al. |
| 2011/0204528 A1 | 8/2011 | Matsutani et al. |
| 2011/0229687 A1 | 9/2011 | Gu et al. |
| 2011/0240611 A1 | 10/2011 | Torbjoern |
| 2011/0248405 A1 | 10/2011 | Li et al. |
| 2011/0256344 A1 | 10/2011 | Ono et al. |
| 2011/0259373 A1 | 10/2011 | Hotta et al. |
| 2011/0259860 A1 | 10/2011 | Bass et al. |
| 2011/0277507 A1 | 11/2011 | Lu et al. |
| 2011/0300908 A1 | 12/2011 | Grespan et al. |
| 2011/0308942 A1 | 12/2011 | Liu et al. |
| 2011/0316561 A1 | 12/2011 | Tinsley et al. |
| 2011/0318555 A1 | 12/2011 | Bookbinder et al. |
| 2011/0318561 A1 | 12/2011 | Murata et al. |
| 2012/0013196 A1 | 1/2012 | Kim et al. |
| 2012/0017642 A1 | 1/2012 | Teranishi et al. |
| 2012/0047951 A1 | 2/2012 | Dannoux et al. |
| 2012/0047956 A1 | 2/2012 | Li |
| 2012/0050692 A1 | 2/2012 | Gollier |
| 2012/0052302 A1 | 2/2012 | Matusick et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0092681 A1 | 4/2012 | Cox |
| 2012/0103018 A1 | 5/2012 | Lu et al. |
| 2012/0105095 A1 | 5/2012 | Bryant et al. |
| 2012/0111057 A1 | 5/2012 | Barefoot et al. |
| 2012/0125892 A1 | 5/2012 | Shimoi et al. |
| 2012/0125893 A1 | 5/2012 | Shimoi et al. |
| 2012/0129359 A1 | 5/2012 | Shimoi et al. |
| 2012/0130004 A1 | 5/2012 | Ku et al. |
| 2012/0131958 A1 | 5/2012 | Shimoi et al. |
| 2012/0131962 A1 | 5/2012 | Mitsugi et al. |
| 2012/0135177 A1 | 5/2012 | Cornejo et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0135852 A1 | 5/2012 | Ellison et al. |
| 2012/0135853 A1 | 5/2012 | Amin et al. |
| 2012/0141668 A1 | 6/2012 | Nakashima |
| 2012/0142136 A1 | 6/2012 | Horning et al. |
| 2012/0145331 A1 | 6/2012 | Gomez et al. |
| 2012/0168412 A1 | 7/2012 | Hooper |
| 2012/0196071 A1 | 8/2012 | Cornejo et al. |
| 2012/0205356 A1 | 8/2012 | Pluess |
| 2012/0211923 A1 | 8/2012 | Garner et al. |
| 2012/0214006 A1 | 8/2012 | Chen et al. |
| 2012/0234049 A1 | 9/2012 | Bolton |
| 2012/0234807 A1 | 9/2012 | Sercel et al. |
| 2012/0235969 A1 | 9/2012 | Burns et al. |
| 2012/0241919 A1 | 9/2012 | Mitani |
| 2012/0255935 A1 | 10/2012 | Kakui et al. |
| 2012/0261697 A1 | 10/2012 | Margalit et al. |
| 2012/0276483 A1 | 11/2012 | Ogihara et al. |
| 2012/0276743 A1 | 11/2012 | Won et al. |
| 2012/0299203 A1 | 11/2012 | Sugo et al. |
| 2012/0299219 A1 | 11/2012 | Shimoi et al. |
| 2012/0302139 A1 | 11/2012 | Darcangelo et al. |
| 2012/0308803 A1 | 12/2012 | Dejneka et al. |
| 2013/0019637 A1 | 1/2013 | Sol et al. |
| 2013/0029092 A1 | 1/2013 | Wakioka |
| 2013/0034688 A1 | 2/2013 | Koike et al. |
| 2013/0044371 A1 | 2/2013 | Rupp et al. |
| 2013/0050226 A1 | 2/2013 | Shenoy et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0078891 A1 | 3/2013 | Lee et al. |
| 2013/0089701 A1 | 4/2013 | Hooper et al. |

(56) References Cited

U.S. PATENT DOCUMENTS

| | | |
|---|---|---|
| 2013/0091897 A1 | 4/2013 | Fujii et al. |
| 2013/0105213 A1 | 5/2013 | Hu et al. |
| 2013/0118793 A1 | 5/2013 | Teshima et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0135745 A1 | 5/2013 | Tanida et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0163801 A1 | 6/2013 | Ha et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0180665 A2 | 7/2013 | Gomez et al. |
| 2013/0189806 A1 | 7/2013 | Hoshino |
| 2013/0192305 A1 | 7/2013 | Black et al. |
| 2013/0193585 A1 | 8/2013 | Lin et al. |
| 2013/0205835 A1 | 8/2013 | Giaretta et al. |
| 2013/0209731 A1 | 8/2013 | Nattermann et al. |
| 2013/0210245 A1 | 8/2013 | Jackl |
| 2013/0213467 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0224492 A1 | 8/2013 | Bookbinder et al. |
| 2013/0228918 A1 | 9/2013 | Chen et al. |
| 2013/0247615 A1 | 9/2013 | Boek et al. |
| 2013/0255779 A1 | 10/2013 | Aitken et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0330515 A1 | 12/2013 | Oh et al. |
| 2013/0334185 A1 | 12/2013 | Nomaru |
| 2013/0337599 A1 | 12/2013 | Yun |
| 2013/0340480 A1 | 12/2013 | Nattermann et al. |
| 2014/0015121 A1 | 1/2014 | Koizumi et al. |
| 2014/0027951 A1 | 1/2014 | Srinivas et al. |
| 2014/0034374 A1 | 2/2014 | Cornejo et al. |
| 2014/0034730 A1 | 2/2014 | Lee |
| 2014/0042202 A1 | 2/2014 | Lee |
| 2014/0044143 A1 | 2/2014 | Clarkson et al. |
| 2014/0047957 A1 | 2/2014 | Wu |
| 2014/0054618 A1 | 2/2014 | Li |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0116091 A1 | 4/2014 | Chuang et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0154439 A1 | 6/2014 | DeMartino et al. |
| 2014/0165652 A1 | 6/2014 | Saito |
| 2014/0166199 A1 | 6/2014 | Bellman et al. |
| 2014/0170378 A1 | 6/2014 | Bellman et al. |
| 2014/0174131 A1 | 6/2014 | Saito et al. |
| 2014/0199519 A1 | 7/2014 | Schillinger et al. |
| 2014/0216108 A1 | 8/2014 | Wiegel et al. |
| 2014/0231390 A1 | 8/2014 | Nukaga et al. |
| 2014/0235796 A1 | 8/2014 | Ogihara et al. |
| 2014/0242375 A1 | 8/2014 | Mauro et al. |
| 2014/0254004 A1 | 9/2014 | Wooder et al. |
| 2014/0290310 A1 | 10/2014 | Green |
| 2014/0300728 A1 | 10/2014 | Drescher et al. |
| 2014/0312506 A1 | 10/2014 | Hayashi et al. |
| 2014/0320947 A1 | 10/2014 | Egerton et al. |
| 2014/0333929 A1 | 11/2014 | Sung et al. |
| 2014/0339207 A1 | 11/2014 | Sugiyama et al. |
| 2014/0340730 A1 | 11/2014 | Bergh et al. |
| 2014/0342897 A1 | 11/2014 | Amin et al. |
| 2014/0347083 A1 | 11/2014 | Bryant et al. |
| 2014/0361463 A1 | 12/2014 | Desimone et al. |
| 2014/0376006 A1 | 12/2014 | Scheiner |
| 2015/0021513 A1 | 1/2015 | Kim et al. |
| 2015/0027757 A1 | 1/2015 | Shin et al. |
| 2015/0036065 A1 | 2/2015 | Yousefpor et al. |
| 2015/0037553 A1 | 2/2015 | Mauro |
| 2015/0038313 A1 | 2/2015 | Hosseini |
| 2015/0051060 A1 | 2/2015 | Ellison et al. |
| 2015/0054136 A1 | 2/2015 | Ebefors et al. |
| 2015/0060402 A1 | 3/2015 | Burkett et al. |
| 2015/0075221 A1 | 3/2015 | Kawaguchi et al. |
| 2015/0075222 A1 | 3/2015 | Mader |
| 2015/0093908 A1 | 4/2015 | Reddy et al. |
| 2015/0102498 A1 | 4/2015 | Enicks et al. |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140299 A1 | 5/2015 | Ellison et al. |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0173191 A1 | 6/2015 | Takahashi |
| 2015/0183679 A1 | 7/2015 | Saito |
| 2015/0232369 A1 | 8/2015 | Marjanovic et al. |
| 2015/0239775 A1 | 8/2015 | Amin et al. |
| 2015/0274583 A1 | 10/2015 | An et al. |
| 2015/0299018 A1 | 10/2015 | Bhuyan et al. |
| 2015/0306847 A1 | 10/2015 | Bellman et al. |
| 2015/0329415 A1 | 11/2015 | Bellman et al. |
| 2015/0360991 A1 | 12/2015 | Grundmueller et al. |
| 2015/0367442 A1 | 12/2015 | Bovatsek et al. |
| 2015/0368145 A1 | 12/2015 | Senshu et al. |
| 2015/0376050 A1 | 12/2015 | Nakamura et al. |
| 2016/0008927 A1 | 1/2016 | Grundmueller et al. |
| 2016/0009066 A1 | 1/2016 | Nieber et al. |
| 2016/0016257 A1 | 1/2016 | Abbas |
| 2016/0023922 A1 | 1/2016 | Addiego et al. |
| 2016/0026842 A1 | 1/2016 | Withers et al. |
| 2016/0031745 A1 | 2/2016 | Ortner et al. |
| 2016/0035587 A1 | 2/2016 | Keech et al. |
| 2016/0059359 A1 | 3/2016 | Krueger et al. |
| 2016/0060156 A1 | 3/2016 | Krueger et al. |
| 2016/0102009 A1 | 4/2016 | Boek et al. |
| 2016/0107925 A1 | 4/2016 | Burket et al. |
| 2016/0145149 A1 | 5/2016 | Burket et al. |
| 2016/0152516 A1 | 6/2016 | Bazemore et al. |
| 2016/0166395 A9 | 6/2016 | Weiman |
| 2016/0199944 A1 | 7/2016 | Hosseini |
| 2016/0200621 A1 | 7/2016 | N'Gom et al. |
| 2016/0201474 A1 | 7/2016 | Slavens et al. |
| 2016/0204126 A1 | 7/2016 | Amano |
| 2016/0208387 A1 | 7/2016 | Liu et al. |
| 2016/0219704 A1 | 7/2016 | Vandemeer et al. |
| 2016/0237571 A1 | 8/2016 | Liu et al. |
| 2016/0280580 A1 | 9/2016 | Bohme |
| 2016/0282584 A1 | 9/2016 | Cui |
| 2016/0289669 A1 | 10/2016 | Fan et al. |
| 2016/0290791 A1 | 10/2016 | Buono et al. |
| 2016/0305764 A1 | 10/2016 | Cui et al. |
| 2016/0311717 A1 | 10/2016 | Nieber et al. |
| 2016/0312365 A1 | 10/2016 | Cordonier et al. |
| 2016/0322291 A1 | 11/2016 | Goers |
| 2016/0327744 A1 | 11/2016 | Giaretta et al. |
| 2016/0334203 A1 | 11/2016 | Cui et al. |
| 2016/0352023 A1 | 11/2016 | Dang et al. |
| 2016/0351410 A1 | 12/2016 | Fu et al. |

(56) References Cited

U.S. PATENT DOCUMENTS

| | | | |
|---|---|---|---|
| 2016/0362331 A1 | 12/2016 | Castle et al. |
| 2016/0365275 A1 | 12/2016 | Chang et al. |
| 2016/0368100 A1 | 12/2016 | Marjanovic et al. |
| 2016/0370680 A1 | 12/2016 | Geerlings et al. |
| 2016/0376186 A1 | 12/2016 | Gross |
| 2017/0002601 A1 | 1/2017 | Bergh et al. |
| 2017/0008122 A1 | 1/2017 | Wieland et al. |
| 2017/0011914 A1 | 1/2017 | Sumant et al. |
| 2017/0029957 A1 | 2/2017 | Moon et al. |
| 2017/0036419 A1 | 2/2017 | Adib et al. |
| 2017/0103249 A1 | 4/2017 | Jin et al. |
| 2017/0119891 A1 | 5/2017 | Lal et al. |
| 2017/0160077 A1 | 6/2017 | Featherstone et al. |
| 2017/0169847 A1 | 6/2017 | Tamaki |
| 2017/0228884 A1 | 8/2017 | Yoshida |
| 2017/0252859 A1 | 9/2017 | Kumkar et al. |
| 2017/0276951 A1 | 9/2017 | Kumkar et al. |
| 2017/0358447 A1 | 12/2017 | Tsunetomo et al. |
| 2017/0363417 A1 | 12/2017 | Cui et al. |
| 2017/0372899 A1 | 12/2017 | Yang et al. |
| 2018/0005922 A1 | 1/2018 | Levesque et al. |
| 2018/0033128 A1 | 2/2018 | Sobieranski et al. |
| 2018/0057390 A1 | 3/2018 | Hackert et al. |
| 2018/0062342 A1 | 3/2018 | Comstock, II et al. |
| 2018/0068868 A1 | 3/2018 | Jaramillo et al. |
| 2018/0093914 A1 | 4/2018 | Akarapu et al. |
| 2018/0215647 A1 | 8/2018 | Ortner et al. |
| 2018/0340262 A1 | 11/2018 | Hiranuma |
| 2018/0342450 A1 | 11/2018 | Huang et al. |
| 2018/0342451 A1 | 11/2018 | Dahlberg et al. |
| 2019/0012514 A1 | 1/2019 | Jin et al. |
| 2019/0185373 A1 | 6/2019 | Hu et al. |
| 2020/0156990 A1 | 5/2020 | Sakade et al. |

FOREIGN PATENT DOCUMENTS

| | | |
|---|---|---|
| CA | 2530607 A1 | 4/2005 |
| CN | 1096936 A | 1/1995 |
| CN | 1196562 A | 10/1998 |
| CN | 2388062 Y | 7/2000 |
| CN | 1473087 A | 2/2004 |
| CN | 1485812 A | 3/2004 |
| CN | 1200793 C | 5/2005 |
| CN | 1619778 A | 5/2005 |
| CN | 1636912 A | 7/2005 |
| CN | 1657220 A | 8/2005 |
| CN | 1735568 A | 2/2006 |
| CN | 1761378 A | 4/2006 |
| CN | 1845812 A | 10/2006 |
| CN | 1283409 C | 11/2006 |
| CN | 1967815 A | 5/2007 |
| CN | 101048255 A | 10/2007 |
| CN | 101238572 A | 8/2008 |
| CN | 101386466 A | 3/2009 |
| CN | 101427427 A | 5/2009 |
| CN | 101438397 A | 5/2009 |
| CN | 100494879 C | 6/2009 |
| CN | 101502914 A | 8/2009 |
| CN | 100546004 C | 9/2009 |
| CN | 100555601 C | 10/2009 |
| CN | 101602148 A | 12/2009 |
| CN | 101610870 A | 12/2009 |
| CN | 201357287 Y | 12/2009 |
| CN | 101631739 A | 1/2010 |
| CN | 101637849 A | 2/2010 |
| CN | 201471092 U | 5/2010 |
| CN | 101722367 A | 6/2010 |
| CN | 101862907 A | 10/2010 |
| CN | 101965242 A | 2/2011 |
| CN | 102046545 A | 5/2011 |
| CN | 102060437 A | 5/2011 |
| CN | 102246292 A | 11/2011 |
| CN | 102300820 A | 12/2011 |
| CN | 102304323 A | 1/2012 |
| CN | 102319960 A | 1/2012 |
| CN | 102326232 A | 1/2012 |
| CN | 102343631 A | 2/2012 |
| CN | 102356049 A | 2/2012 |
| CN | 102356050 A | 2/2012 |
| CN | 102428047 A | 4/2012 |
| CN | 102458754 A | 5/2012 |
| CN | 102485405 A | 6/2012 |
| CN | 102540474 A | 7/2012 |
| CN | 102574246 A | 7/2012 |
| CN | 102585696 A | 7/2012 |
| CN | 102596830 A | 7/2012 |
| CN | 102649199 A | 8/2012 |
| CN | 102672355 A | 9/2012 |
| CN | 102795596 A | 11/2012 |
| CN | 102898014 A | 1/2013 |
| CN | 102916081 A | 2/2013 |
| CN | 102923939 A | 2/2013 |
| CN | 102958642 A | 3/2013 |
| CN | 103013374 A | 4/2013 |
| CN | 103079747 A | 5/2013 |
| CN | 103143841 A | 6/2013 |
| CN | 103159401 A | 6/2013 |
| CN | 203021443 U | 6/2013 |
| CN | 103237771 A | 8/2013 |
| CN | 103273195 A | 9/2013 |
| CN | 103316990 A | 9/2013 |
| CN | 103359947 A | 10/2013 |
| CN | 103359948 A | 10/2013 |
| CN | 103460368 A | 12/2013 |
| CN | 103531414 A | 1/2014 |
| CN | 103534216 A | 1/2014 |
| CN | 103746027 A | 4/2014 |
| CN | 203509350 U | 4/2014 |
| CN | 104344202 A | 2/2015 |
| CN | 104897062 A | 9/2015 |
| CN | 105246850 A | 1/2016 |
| CN | 105392593 A | 3/2016 |
| CN | 105693102 A | 6/2016 |
| CN | 106132627 A | 11/2016 |
| CN | 108191258 A | 6/2018 |
| DE | 2231330 A1 | 1/1974 |
| DE | 10322376 A1 | 12/2004 |
| DE | 102006035555 A1 | 1/2008 |
| DE | 102010003817 A1 | 10/2011 |
| DE | 102011000768 A1 | 8/2012 |
| DE | 102012010635 A1 | 11/2013 |
| DE | 102012110971 A1 | 5/2014 |
| DE | 102013103370 A1 | 10/2014 |
| DE | 102013223637 A1 | 5/2015 |
| DE | 102014113339 A1 | 3/2016 |
| EP | 247993 A1 | 12/1987 |
| EP | 0270897 A1 | 6/1988 |
| EP | 280918 A2 | 9/1988 |
| EP | 0393381 A2 | 10/1990 |
| EP | 0938946 A1 | 9/1999 |
| EP | 1043110 A2 | 10/2000 |
| EP | 1159104 A1 | 12/2001 |
| EP | 1164113 A1 | 12/2001 |
| EP | 1412131 A1 | 4/2004 |
| EP | 1449810 A2 | 8/2004 |
| EP | 1609559 A1 | 12/2005 |
| EP | 1614665 A1 | 1/2006 |
| EP | 1651943 A2 | 5/2006 |
| EP | 1714730 A1 | 10/2006 |
| EP | 1990125 A1 | 11/2008 |
| EP | 2020273 A1 | 2/2009 |
| EP | 2133170 A1 | 12/2009 |
| EP | 2202545 A1 | 6/2010 |
| EP | 2253414 A1 | 11/2010 |
| EP | 2398746 A1 | 12/2011 |
| EP | 2543065 A1 | 1/2013 |
| EP | 2574983 A1 | 4/2013 |
| EP | 2600397 A1 | 6/2013 |
| EP | 2754524 A1 | 7/2014 |
| EP | 2781296 A1 | 9/2014 |
| EP | 2783784 A2 | 10/2014 |
| EP | 2831913 A1 | 2/2015 |
| EP | 2859984 A2 | 4/2015 |
| EP | 2922793 A1 | 9/2015 |

(56) References Cited

FOREIGN PATENT DOCUMENTS

| | | |
|---|---|---|
| EP | 3166372 A1 | 5/2017 |
| EP | 3288906 A1 | 3/2018 |
| FR | 2989294 A1 | 10/2013 |
| GB | 1242172 A | 8/1971 |
| GB | 2481190 A | 12/2011 |
| IN | 201102390 | 3/2013 |
| JP | 55-130839 A | 10/1980 |
| JP | 56-129261 A | 10/1981 |
| JP | 56-160893 A | 12/1981 |
| JP | 60-220340 A | 11/1985 |
| JP | 64-077001 A | 3/1989 |
| JP | 01-179770 A | 7/1989 |
| JP | 03-252384 A | 11/1991 |
| JP | 04-349132 A | 12/1992 |
| JP | 06-079486 A | 3/1994 |
| JP | 06-318756 A | 11/1994 |
| JP | 09-106243 A | 4/1997 |
| JP | 10-263873 A | 10/1998 |
| JP | 11-197498 A | 7/1999 |
| JP | 11-269683 A | 10/1999 |
| JP | 11-297703 A | 10/1999 |
| JP | 11-330597 A | 11/1999 |
| JP | 11-347758 A | 12/1999 |
| JP | 2000-010289 A | 1/2000 |
| JP | 2000-301372 A | 10/2000 |
| JP | 2000-302488 A | 10/2000 |
| JP | 2001-105398 A | 4/2001 |
| JP | 2001-106545 A | 4/2001 |
| JP | 2001-138083 A | 5/2001 |
| JP | 2002-028799 A | 1/2002 |
| JP | 2002-154846 A | 5/2002 |
| JP | 2002-210730 A | 7/2002 |
| JP | 2002-228818 A | 8/2002 |
| JP | 2003-017503 A | 1/2003 |
| JP | 2003-062756 A | 3/2003 |
| JP | 2003-114400 A | 4/2003 |
| JP | 2003-154517 A | 5/2003 |
| JP | 2003148931 A | 5/2003 |
| JP | 2003-181668 A | 7/2003 |
| JP | 2003-197811 A | 7/2003 |
| JP | 2003-238178 A | 8/2003 |
| JP | 2004-190043 A | 7/2004 |
| JP | 2004-209675 A | 7/2004 |
| JP | 2004-255562 A | 9/2004 |
| JP | 2004-330236 A | 11/2004 |
| JP | 2004-351494 A | 12/2004 |
| JP | 2004363212 A | 12/2004 |
| JP | 2005-000952 A | 1/2005 |
| JP | 2005-019576 A | 1/2005 |
| JP | 2005-074663 A | 3/2005 |
| JP | 2005-104819 A | 4/2005 |
| JP | 2005-121417 A | 5/2005 |
| JP | 2005-144622 A | 6/2005 |
| JP | 2005-205440 A | 8/2005 |
| JP | 2005257339 A | 9/2005 |
| JP | 2005-279755 A | 10/2005 |
| JP | 2005-288503 A | 10/2005 |
| JP | 2005-306702 A | 11/2005 |
| JP | 2006-130691 A | 5/2006 |
| JP | 3775250 B2 | 5/2006 |
| JP | 3775410 B2 | 5/2006 |
| JP | 2006-161124 A | 6/2006 |
| JP | 2006-248885 A | 9/2006 |
| JP | 3823108 B2 | 9/2006 |
| JP | 2006-290630 A | 10/2006 |
| JP | 2007-021548 A | 2/2007 |
| JP | 2007-042741 A | 2/2007 |
| JP | 2007-067031 A | 3/2007 |
| JP | 2007-196277 A | 8/2007 |
| JP | 2007-253203 A | 10/2007 |
| JP | 2007-260896 A | 10/2007 |
| JP | 2008-094641 A | 4/2008 |
| JP | 2008-156200 A | 7/2008 |
| JP | 2008-522950 A | 7/2008 |
| JP | 2008-247639 A | 10/2008 |
| JP | 2008-273783 A | 11/2008 |
| JP | 2008288577 A | 11/2008 |
| JP | 2009-200356 A | 9/2009 |
| JP | 4349132 B2 | 10/2009 |
| JP | 4418282 B2 | 2/2010 |
| JP | 2010-046761 A | 3/2010 |
| JP | 2010074017 A | 4/2010 |
| JP | 2010-539288 A | 12/2010 |
| JP | 4592855 B2 | 12/2010 |
| JP | 2011-011212 A | 1/2011 |
| JP | 2011-037707 A | 2/2011 |
| JP | 2011-049398 A | 3/2011 |
| JP | 4672689 B2 | 4/2011 |
| JP | 2011-517299 A | 6/2011 |
| JP | 2011-143434 A | 7/2011 |
| JP | 2011178642 A | 9/2011 |
| JP | 2011-228517 A | 11/2011 |
| JP | 2011-251872 A | 12/2011 |
| JP | 2012-024782 A | 2/2012 |
| JP | 2012-028533 A | 2/2012 |
| JP | 2012-031018 A | 2/2012 |
| JP | 4880820 B2 | 2/2012 |
| JP | 2012-506837 | 3/2012 |
| JP | 2012-159749 A | 8/2012 |
| JP | 2012-517957 A | 8/2012 |
| JP | 2012-187618 A | 10/2012 |
| JP | 2013-007842 A | 1/2013 |
| JP | 2013-031879 A | 2/2013 |
| JP | 2013-043808 A | 3/2013 |
| JP | 2013-075802 A | 4/2013 |
| JP | 2013-091578 A | 5/2013 |
| JP | 2013-121908 A | 6/2013 |
| JP | 5274085 B2 | 8/2013 |
| JP | 2013-178371 A | 9/2013 |
| JP | 2013-187247 A | 9/2013 |
| JP | 2013-536081 A | 9/2013 |
| JP | 5300544 B2 | 9/2013 |
| JP | 2013-203630 A | 10/2013 |
| JP | 2013-203631 A | 10/2013 |
| JP | 2013-223886 A | 10/2013 |
| JP | 5318748 B2 | 10/2013 |
| JP | 2013220958 A | 10/2013 |
| JP | 2013-245153 A | 12/2013 |
| JP | 2014-127701 A | 7/2014 |
| JP | 2014-214036 A | 11/2014 |
| JP | 2015-501531 A | 1/2015 |
| JP | 2015-030040 A | 2/2015 |
| JP | 2015-129076 A | 7/2015 |
| JP | 2015-519722 A | 7/2015 |
| JP | 2015146410 A | 8/2015 |
| JP | 2016-508069 A | 3/2016 |
| JP | 2016-213253 A | 12/2016 |
| JP | 2017-059669 A | 3/2017 |
| JP | 2017-510531 A | 4/2017 |
| KR | 10-2002-0038707 A | 5/2002 |
| KR | 10-2002-0066005 A | 8/2002 |
| KR | 10-2009-0057161 A | 6/2009 |
| KR | 2010-0120297 A | 11/2010 |
| KR | 10-1020621 B1 | 3/2011 |
| KR | 2011-0046953 A | 5/2011 |
| KR | 2011-0121637 A | 11/2011 |
| KR | 10-2012-0015366 A | 2/2012 |
| KR | 10-1120471 B1 | 3/2012 |
| KR | 10-1159697 B1 | 6/2012 |
| KR | 10-2012-0074508 A | 7/2012 |
| KR | 2012-0102675 A | 9/2012 |
| KR | 2013-0031380 A | 3/2013 |
| KR | 10-1259349 B1 | 4/2013 |
| KR | 10-1269474 B1 | 5/2013 |
| KR | 2013-0079395 A | 7/2013 |
| KR | 10-2013-0111269 A | 10/2013 |
| KR | 10-2013-0124646 A | 11/2013 |
| KR | 10-1344368 B1 | 12/2013 |
| KR | 10-2014-0022980 A | 2/2014 |
| KR | 10-2014-0022981 A | 2/2014 |
| KR | 10-2014-0064220 A | 5/2014 |
| KR | 10-1423338 B1 | 7/2014 |
| KR | 10-2014-0112652 A | 9/2014 |
| KR | 2015-0016176 A | 2/2015 |

(56) References Cited

FOREIGN PATENT DOCUMENTS

| | | |
|---|---|---|
| TW | 200423242 A | 11/2004 |
| TW | 200842313 A | 11/2008 |
| TW | 200842345 A | 11/2008 |
| TW | 201027601 A | 7/2010 |
| TW | 201041027 A | 11/2010 |
| TW | 201041118 A | 11/2010 |
| TW | 201212755 A | 3/2012 |
| TW | 201226345 A | 7/2012 |
| TW | 201303259 A | 1/2013 |
| TW | 201311592 A | 3/2013 |
| TW | 201317622 A | 5/2013 |
| TW | 201331136 A | 8/2013 |
| TW | 201339111 A | 10/2013 |
| TW | 201340272 A | 10/2013 |
| TW | 201429897 A | 8/2014 |
| TW | 201610602 A | 3/2016 |
| TW | 201621267 A | 6/2016 |
| WO | 89/02877 A1 | 4/1989 |
| WO | 98/21154 A1 | 5/1998 |
| WO | 99/29243 A1 | 6/1999 |
| WO | 99/63900 A1 | 12/1999 |
| WO | 00/51778 A1 | 9/2000 |
| WO | 01/33621 A2 | 5/2001 |
| WO | 2002/081142 A1 | 10/2002 |
| WO | 2003/007370 A1 | 1/2003 |
| WO | 03/11522 A1 | 2/2003 |
| WO | 03021004 A1 | 3/2003 |
| WO | 2004/110693 A1 | 12/2004 |
| WO | 2005/031300 A2 | 4/2005 |
| WO | 2005/033033 A1 | 4/2005 |
| WO | 2005/034594 A1 | 4/2005 |
| WO | 2006/073098 A1 | 7/2006 |
| WO | 2006/112822 A1 | 10/2006 |
| WO | 2007/094160 A1 | 8/2007 |
| WO | 2007/094233 A1 | 8/2007 |
| WO | 2007/096958 A1 | 8/2007 |
| WO | 2008/012186 A1 | 1/2008 |
| WO | 2008/080182 A1 | 7/2008 |
| WO | 2008/102848 A1 | 8/2008 |
| WO | 2008110061 A1 | 9/2008 |
| WO | 2008/128612 A1 | 10/2008 |
| WO | 2009/072810 A2 | 6/2009 |
| WO | 2009/114375 A2 | 9/2009 |
| WO | 2010/035736 A1 | 4/2010 |
| WO | 2010/087483 A1 | 8/2010 |
| WO | 2010/096359 A1 | 8/2010 |
| WO | 2010/111609 A2 | 9/2010 |
| WO | 2010/129459 A2 | 11/2010 |
| WO | 2011/025908 A1 | 3/2011 |
| WO | 2011/056781 A1 | 5/2011 |
| WO | 2011/109648 A1 | 9/2011 |
| WO | 2012/006736 A2 | 1/2012 |
| WO | 2012/011230 A1 | 1/2012 |
| WO | 2012/027220 A2 | 3/2012 |
| WO | 2012/060277 A1 | 5/2012 |
| WO | 2012/075072 A2 | 6/2012 |
| WO | 2012/108052 A1 | 8/2012 |
| WO | 2012/161317 A1 | 11/2012 |
| WO | 2012/166753 A1 | 12/2012 |
| WO | 2013/008344 A1 | 1/2013 |
| WO | 2013/016157 A1 | 1/2013 |
| WO | 2013/022148 A1 | 2/2013 |
| WO | 2013/030848 A1 | 3/2013 |
| WO | 2013/043173 A1 | 3/2013 |
| WO | 2013/084877 A1 | 6/2013 |
| WO | 2013/084879 A1 | 6/2013 |
| WO | 2013/130718 A1 | 9/2013 |
| WO | 2013/134237 A1 | 9/2013 |
| WO | 2013/138802 A1 | 9/2013 |
| WO | 2013/147694 A1 | 10/2013 |
| WO | 2013/150990 A1 | 10/2013 |
| WO | 2013/153195 A1 | 10/2013 |
| WO | 2014/010490 A1 | 1/2014 |
| WO | 2014/012125 A1 | 1/2014 |
| WO | 2014/028022 A1 | 2/2014 |
| WO | 2014/038326 A1 | 3/2014 |
| WO | 2014/064492 A1 | 5/2014 |
| WO | 2014/079478 A1 | 5/2014 |
| WO | 2014/079570 A1 | 5/2014 |
| WO | 2014/085660 A1 | 6/2014 |
| WO | 2014/085663 A1 | 6/2014 |
| WO | 2014/111385 A1 | 7/2014 |
| WO | 2014/111794 A1 | 7/2014 |
| WO | 2014/121261 A1 | 8/2014 |
| WO | 2014/148020 A1 | 9/2014 |
| WO | 2014/161535 A2 | 10/2014 |
| WO | 2014/161534 A3 | 11/2014 |
| WO | 2014/205301 A2 | 12/2014 |
| WO | 2015/029286 A1 | 3/2015 |
| WO | 2015/077113 A1 | 5/2015 |
| WO | 2015/094898 A2 | 6/2015 |
| WO | 2015/095088 A1 | 6/2015 |
| WO | 2015/095090 A1 | 6/2015 |
| WO | 2015/095146 A1 | 6/2015 |
| WO | 2015/095151 A2 | 6/2015 |
| WO | 2015/100056 A1 | 7/2015 |
| WO | 2015113023 A1 | 7/2015 |
| WO | 2015/127583 A1 | 9/2015 |
| WO | 2015157202 A1 | 10/2015 |
| WO | 2016/005455 A1 | 1/2016 |
| WO | 2016/010991 A1 | 1/2016 |
| WO | 2016010954 A2 | 1/2016 |
| WO | 2016/069821 A1 | 5/2016 |
| WO | 2016089844 A1 | 6/2016 |
| WO | 2016118683 A1 | 7/2016 |
| WO | 2016/154284 A1 | 9/2016 |
| WO | 2016/178966 A1 | 11/2016 |
| WO | 2016176171 A1 | 11/2016 |
| WO | 2016/201027 A2 | 12/2016 |
| WO | 2017038075 A1 | 3/2017 |
| WO | 2017062798 A1 | 4/2017 |
| WO | 2017/127489 A1 | 7/2017 |
| WO | 2017/210376 A1 | 12/2017 |
| WO | 2018162385 A1 | 9/2018 |

OTHER PUBLICATIONS

Pie Scientific, Photoresist stripping and descum organic contamination removal for silicon wafer, Feb. 2016 (Year: 2016).

West et al., Optimisation of photoresist removal from silicon wafers using atmosphericpressure plasma jet effluent, Jul. 2015, 22nd International Symposium on Plasma Chemistry (Year: 2015).

Japanese Patent Application No. 2018-567871, Office Action dated Jun. 14, 2021, 7 pages (3 pages of English Translation and 4 pages of Original Document), Japanese Patent Office.

Kruger et al., "Laser micromachining of barium aluminium borosilicate glass with pluse durations between 20 fs and 3 ps"; Applied Surface Science 127-129 (1998) 892-898.

Kruger et al., "Structuring of dielectric and metallic materials with ultrashort laser pulses between 20 fs and 3 ps" SPIE vol. 2991, 0277-786X/97, pp. 40-47.

Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.

Levy et al. "Design, fabrication, and characterization of circular Dammann gratings based on grayscale Tithography," Opt. Lett vol. 35, No. 6, p. 880-882 (2010).

Li et al. "Thick Polymer cover layers for laser micromachining of fine holes," Applied Physics A, Sep. 2005, vol. 81, Issues 4, pp. 753-758.

Liu X et al. "laser ablation and micromachining with ultrashort laser pulses", IEEE J. Quantum Electronics, 22, 1706-1716, 1997.

Madehow.com, Liquid Crystal Display (LCD), Jan. 29, 2006, https:/fweb.archive.org/web/20060129092154/http://www.madehow.com/Volume-1/Liquid-Crystal-Display-LCD.html; pp. 1-6.

Maeda et al. "Optical performance of angle-dependent light-control glass", Proc. SPIE 1536, Optical Materials Technology for Energy Efficiency and Solar Energy Conversion X, 138 (Dec. 1, 1991).

Matsusaka et al. "Micro-machinability of silversodium ion-exchanged glass by UV nanosecond laser," J. Materials Processing Technology 202 (2008) 514-520.

(56) References Cited

OTHER PUBLICATIONS

Mbise et al. "Angular selective window coatings: theory and experiments" J. Phys. D: Appl. Phys. 30 2103 (1997).
McGloin et al."Bessel beams: diffraction in a new light" Contemporary Physics, vol. 46 No. 1 (2005) pp. 15-28.
Merola et al. "Characterization of Bessel beams generated by polymeric microaxicons" Meas. Sci. Technol. 23 (2012) 10 pgs.
MicroChemicals, Silicon Wafers Quartz Wafers Glass Wafers, 2014 (no month) (Year: 2014).
Miranda et al. (Ultraviolet-induced crosslinking of poly(vinyl alcohol) evaluated by principal component analysis of FTIR spectra; Polym Int 50:1068-1072(2001).
Mirkhalaf, M. et al., Overcoming the brittleness of glass through bio-inspiration and micro-achitecture, Nature Communications, 5:3166/ncomm4166(2014).
Mukhina L.; "Laser Pulse Damage on the Surface of Ion Exchange Treated Glass"; Soviet Journal of Glass Physics and Chemistry; vol. 19; No. 3; pp. 269-272; (1993.
Perry et al., "Ultrashort-pulse laser machining of dielectric materials"; Journal of Applied Physics, vol. 85, No. 9, May 1, 1999, American Institute of Physics, pp. 6803-6810.
Perry et al., "Ultrashort-pulse laser machining"; UCRL-1D-132159, Sep. 1998, pp. 1-38.
Perry et al., "Ultrashort-pulse laser machining"; UCRL-JC-132159 Rev 1., Jan. 22, 1999, pp. 1-24.
Polavka et al. "Crosslinking of polymers by the effect of ultraviolet radiation crosslinking of poly(vinyl alcohol) in the presence ofIerephthalic aldehyde"; 1980.
Polynkin et al., "Extended filamentation with temporally chirped femtosecond Bessel-Gauss beams in air"; Optics Express, vol. 17, No. 2, Jan. 19, 2009, OSA, pp. 575-584.
Ramil et al. "Micromachining of glass by the third harmonic of nanosecond Nd:YVO4 laser", Applied Surface Science 255 (2009) p. 5557-5560.
Romero et al. "Theory of optimal beam splitting by phase gratings. II. Square and hexagonal gratings" J. Opt. Soc. Am. A/vol. 24 No. 8 (2007) pp. 2296-2312.
Salleo A et al., Machining of transparent materials using IR and UV nanosecond laser pulses, Appl. Physics A 71, 601-608, 2000.
Serafetinides et al., "Polymer ablation by ultra-short pulsed lasers" Proceedings of SPIE vol. 3885 (2000) http://proceedings.spiedigitallibrary.org/.
Serafetinides et al., "Ultra-short pulsed laser ablation of polymers"; Applied Surface Science 180 (2001) 42-56.
Shah et al. "Micromachining with a high repetition rate femtosecond fiber laser", Journal of Laser Micro/Nanoengineering vol. 3 No. 3 (2008) pp. 157-162.
Shealy et al. "Geometric optics-based design of laser beam shapers",Opt. Eng. 42(11), 3123-3138 (2003). doi:10.1117/1.1617311.
Smedskjaer et al.; "Impact Of ZnO on the Structure and Properties of Sodium Aluminosilicate Glasses: Comparison With Alkaline Earth Oxides," Journal of Noncrystalline Solids 381, 58-64 (2013).
Stoian et al. "Spatial and temporal laser pulse design for material processing on ultrafast scales" Applied Physics A (2014) 114, p. 119-127.
Sundaram et al., "Inducing and probing non-thermal transitions in semiconductors using femtosecond laser pulses" Nature Miracles, vol. 1, Dec. 2002, Nature Publishing Group (2002), pp. 217-224.
Swift Glass, Quartz/Fused Silica, Mar. 2016 (Year: 2016).
Tom Christiansen, Tami Erickson; Standard Operating Procedure: Spin-On-Glass, Surface Level Characterization (2000).
Toytman et al. "Optical breakdown in transparent media with adjustable axial length and location", Optics Express vol. 18 No. 24, 24688-24698 (2010).
Tsai et al. "Investigation of underwater laser drilling for brittle substrates," J. Materials Processing technology 209 (2009) 2838-2846.
Uzgiris et al. "Etched Laser Filament Tracks in Glasses and Polymers", (1973) Phys. Rev. A 7, 734-740.

Vanagas et al., "Glass cutting by femtosecond pulsed irradiation"; J. Micro/Nanolith. MEMS MOEMS. 3(2), 358-363 (April 1, 2004); doi: 10.1117/1.1668274.
Varel et al., "Micromachining of quartz with ultrashort laser pulses"; Applied Physics A 65, 367-373, Springer-Verlag (1997).
Velpula et al. "Ultrafast imaging of free carriers: controlled excitation with chirped ultrafast laser Bessel beams", Proc. of SPIE vol. 8967 896711-1 (2014).
Wang et al, "Investigation on CO2 laser irradiation inducing glass strip peeling for microchannel formation", Biomicrofluidics 6, 012820 (2012).
Wlodarczyk et al. "The Impact of Graphite Coating and Wavelength on Picosecond Laser Machining of Optical Glasses,", 31st ICALEO Program Notes (2012). Paper M#309.
Wu et al. "Optimal orientation of the cutting head for enhancing smoothness movement in three-dimensional laser cutting" (2013) Zhongguo Jiguang/Chinese Journal of Lasers, 40 (1), art. No. 0103005.
Xu et al. "Optimization of 3D laser cutting head orientation based on the minimum energy consumption" (2014) International Journal of Advanced Manufacturing Technology, 74 (9-12), pp. 1283-1291.
Yan et al. "Fiber structure to convert a Gaussian beam to higher-order optical orbital angular momentum modes" Optics Letters vol. 37 No. 16 (2012) pp. 3294-3296.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
"EagleEtch" Product Brochure, EuropeTec USA Inc., pp. 1-8, Aug. 1, 2014.
"PHAROS High-power femtosecond laser system" product brochure; Light Conversion, Vilnius, LT; Apr. 18, 2011, pp. 1-2.
"TruMicro 5000" Product Manual, Trumpf Laser GmbH + Co. KG, pp. 1-4, Aug. 2011.
"What is the difference between Ra and RMS?"; Harrison Electropolishing LP (http://www.harrisonep.com/electropolishingra.html), Accessed Aug. 8, 2016.
Abakians et al."Evaporative Cutting of a Semitransparent Body With a Moving CW Laser", J. Heat Transfer 110(4a), 924-930 (Nov. 1, 1988) (7 pages) doi:10.1115/1.3250594.
Abramov et al., "Laser separation of chemically strengthened glass"; Physics Procedia 5 (2010) 285-290, Elsevier.; doi: 10.1016/j.phpro.2010.08.054.
Ahmed et al. "Display glass cutting by femtosecond laser induced single shot periodic void array" Applied Physics A Materials Science and Proccessing vol. 93 No. 1 (2008) pp. 189-192.
Arimoto et al., "Imaging properties of axicon in a scanning optical system"; Applied Optics, Nov. 1, 1992, vol. 31, No. 31, pp. 6653-6657.
ASTM standard C770-16, entitled "Standard Test Method for Measurement of Glass Stress-Optical Coefficient,".
Bagchi et al. "Fast ion beams from intense, femtosecond laser irradiated nanostructured surfaces" Applied Physics B 88 (2007) p. 167-173.
Bhuyan et al. "Laser micro- and nanostructuring using femtosecond Bessel beams", Eur. Phys. J. Special Topics 199 (2011) p. 101-110.
Bhuyan et al. "Single shot high aspect ratio bulk nanostructuring of fused silica using chirp-controlled ultrafast laser Bessel beams" Applied Physics Letters 104 (2014) 021107.
Bhuyan et al. "Ultrafast Bessel beams for high aspect ratio taper free micromachining of glass" Proc. of SPIE vol. 7728 77281V-1.
Bhuyan et al., "Femtosecond non-diffracting Bessel beams and controlled nanoscale ablation" by IEEE (2011).
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.

(56) References Cited

OTHER PUBLICATIONS

Case Design Guidelines for Apple Devices Release R5 (https://web.archive.org/web/20131006050442/https://developer.apple.com/resources/cases/Case-Design-Guidelines.pdf; archived on Oct. 6, 2013).

Chen et al. "Projection ablation of glass-based single and arrayed microstructures using excimer laser", (2005) Optics and Laser Technology 37, 271-280.

Chiao et al. 9. "Self-trapping of optical beams," Phys. Rev. Lett, vol. 13, No. 15, p. 479 (1964).

Corning Inc., "Corning(Registered) 1737 AM LCD Glass Substrates Material Information", issued Aug. 2002.

Corning Inc., "Corning(Registered) Eagle2000 TM AMLCD Glass Substrates Material Information", issued Apr. 2005.

Corning, Properties of VYCOR Code 7913 96% Silica High Temperature Glass, Apr. 2014 (Year: 2014).

Couairon et al. "Femtosecond filamentation in transparent media" Physics Reports 441 (2007) pp. 47-189.

Courvoisier et al. "Applications of femtosecond Bessel beams to laser ablation" Applied Physics A (2013) 112, p. 29-34.

Courvoisier et al. "Surface nanoprocessing with non-diffracting femtosecond Bessel beams" Optics Letters vol. 34 No. 20, (2009) p. 3163-3165.

Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.

Cubeddu et al., "Compact tissue oximeter based on dual-wavelength multichannel time-resolved reflectance" Applied Optics, vol. 38, No. 16, Jun. 1, 1999, pp. 3670-3680.

Ding et al., "High-resolution optical coherence tomography over a large depth range with an axicon lens"; Optic Letters, vol. 27, No. 4, pp. 243-245, Feb. 15, 2002, Optical Society of America.

Dong et al. "On-axis irradiance distribution of axicons illuminated by spherical wave", Optics & Laser Technology 39 (2007) 1258-1261.

Duocastella et al. "Bessel and annular beams for material processing", Laser Photonics Rev. 6, 607-621, 2012.

Dumin. "Exact solutions for nondiffracting beams I. The scaler theory" J. Opt. Soc. Am. A. 4(4) pp. 651-654.

Eaton et al. "Heat accumulation effects in femtosecond laser written waveguides with variable repetition rates", Opt. Exp. 5280, vol. 14, No. 23, Jun. 2006.

Gattass et al. "Micromachining of bulk glass with bursts of femtosecond laser pulses at variable repetition rates" Opt. Exp. 5280, vol. 14, No. 23, Jun. 2006.

Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.

Glezer et al., "Ultrafast-laser driven micro-explosions in transparent materials"; Applied Physics Letters, vol. 71 (1997), pp. 882-884.

Golub, I., "Fresnel axicon"; Optic Letters, vol. 31, No. 12, Jun. 15, 2006, Optical Society of America, pp. 1890-1892.

Gori et al. "Analytical derivation of the optimum triplicator" Optics Communications 157 (1998) pp. 13-16.

Handbook of Adhesives (3rd edition, Edited by Irving Skeist).

Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.

Honda et al. "A Novel Polymer Film that Controls Light Transmission", Progress in Pacific Polymer Science 3, 159-169 (1994).

Hu et al. "5-axis laser cutting interference detection and correction based on STL model" (2009) Zhongguo Jiguang/Chinese Journal of Lasers, 36 (12), pp. 3313-3317.

Huang et al., "Laser etching of glass substrates by 1064 nm laser irradiation", Applied Physics, Oct. 2008, vol. 93, Issue 1, pp. 159-162.

Jaramillo et al., Wet etching of hydrogenated amorphous carbon films, Mar. 7, 2001, Diamond and Related Materials, vol. 10, Issues 3-7, pp. 976-979 (Year: 2001).

Juodkazis S. et al. Laser induced microexplosion confined in the bulk of a sapphire crystal: evidence of multimegabar pressures., Phys. Rev. Lett. 96, 166101, 2006.

Karlsson et al. "The technology of chemical glass strengthening—a review" Glass Technol: Eur. J. Glass Sci. Technol. A (2010) 51 (2) pp. 41-54.

Kondo et al., Three-Dimensional Microdrilling of Glass by Multiphoton Process and Chemical Etching, 1999, Japanese Journal of Applied Physics, vol. 38, Part 2, No. 10A (Year: 1999).

Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.

Koyama et al. "Laser-micromachining for Ag Ion Exchanged Glasses," Second International Symposium on Laser Precision Microfabrication, Proc. SPE vol. 4426 (2002) 162-165.

Kruger et al. "UV laser drilling of SiC for semiconductor device fabrication," J. Physics:Conference Series 59 (2007) 740-744.

Kruger et al., "Femtosecond-pulse visible laser processing of transparent materials"; Applied Surface Science 96-98 (1996) 430-438.

Benjamin et al.; "The Adhesion of Evaporated Metal Films on Glass"; Proc. Roy. Soc. A., vol. 261, (1962); pp. 516-531.

Borghi et al; "M2 Factor of Bessel-Gauss Beams"; Optics Letters; vol. 22, No. 5; (1997) pp. 262-264.

Chen et al. "Development of an AOI system for chips with a hole on backside based on a frame imager" Proc. of SPIE vol. 9903, 2016. 6 pgs.

Iijima et al.; "Resistivity Reduction by External Oxidation of Cu-Mn Alloy Films for Semiconductor Interconnect Application"; Journal of Vacuum Science & Technology B Microelectronics and Nanometer Structures Processing, Measurement, and Phenomena, 27, 1963-1968 (2009.

Intergrace, "Borosilicate glass: technical glass by Pulles & Hanique: Duan & Pyrex," Pulles & Hanique B.V., 2 pgs. Published Mar. 15, 2012, retrieved from: https://web.archive.org/web/20120315092729/http://www.pulleshanique.com/02_borosilicate-glass.htm.

International Search Report of the International Searching Authority; PCT/US2017/039360 dated Aug. 11, 2017; 12 Pages; European Patent Office.

Kiyama et al.; "Examination of Etching Agent and Etching Mechanism on Femtosecond Laser Microfabrication of Channels Inside Vitreous Silica Substrates"; J. Phys. Chem. C, 2009, 113, pp. 11560-11566.

Koike et al.; "P-33: Cu—Mn Electrodes For a-Si TFT and Its Electrical Characteristics"; SID Symposium Digest of Technical Papers, 41:1, 1343-1346 (2010.

Koike et al.; "Self-Forming Diffusion Barrier Layer in Cu—Mn Alloy Metallization"; Appl. Phys. Lett. 87, 041911-1-041911-3 (2005.

Microchemicals, "Silicon Wafers, Quartz Wafers, Glass Wafers," Product Specifications: Brochure. 2014, 28 pgs.

Ogutu et al.; "Superconformal Filling of High Aspect Ratio Through Glass Vias (TGV) for Interposer Applications Using TNBT and NTBC Additives"; Journal of the Electrochemical Society, 162 (9), D457-D464 (2015.

P-23:The Contact Properties and TFT Structures of A-IGZO TFTS Combined With Cu—Mn Alloy Electrodes "; SID Symposium Digest of Technical Papers 42:1, 1177-1180".

Shorey et al.; "Progress and Application of Through Glass Via (TGV) Technology"; 2016 Pan Pacific Microelectronis Symposium, SMTA, Jan. 25, 2016; pp. 1-6.

Shorey; "Leveraging Glass for Advanced Packaging and IoT"; Apr. 21, 2016, Retrieved Form the Internet: URL:http://www.corning.com/media/worldwide/cdt/documents/iMAPs%20-%20Corning%200verview%20-%204-21-16%20FINALpptx.pdf.

(56) References Cited

OTHER PUBLICATIONS

Siegman; "New Development in Laser Resonators"; SPIE, vol. 1227, Optical Resonators (1990) pp. 2-14.

Thiele; "Relation Between Catalytic Activity and Size of Particle"; Industrial and Engineering Chemistry, vol. 31, No. 7; (1939) pp. 916-920.

Topper et al.; "3-D Thin Film Interposer Based on TGV (Through Glass Vias): an Alternative to Si-Interposer" ; IEEE, Electronic Components and Technology Conference; 2010; pp. 66-73.

U.S. Appl. No. 62/846,059; Cai et al. "Silicate Glass Compositions Useful for the Efficient Production of Through Glass Vias", filed May 10, 2019, 43 pgs. Listed in ID as 28483.

U.S. Appl. No. 62/846,102; Guo et al. "High Silicate Glass Articles Possessing Through Glass Vias and Methods of Making and Using Thereof", filed May 10, 2019,36 pgs. Listed in ID as 28303.

Wakayama et al. "Small size probe for inner profile measurement of pipes using optical fiber ring beam device" Proc. of SPIE vol. 8563, 2012. 7 pgs.

Wu et al., "A Study on Annealing Mechanisms With Different Manganese Contents in CuMn ALLOY" ; Journal of Alloys and Compounds, vol. 542, 2012, pp. 118-123.

Zavyalov, "3D Hole Inspection Using Lens with High Field Curvature" Measurement Science Review, vol. 15, No. 1, 2015. pp. 52-57.

Taiwanese Patent Application No. 110129226, Office Action dated Oct. 1, 2021, 2 pages (English Translation Only); Taiwanese Patent Office.

Korean Patent Application No. 10-2019-7038257, Korean Office Action, dated Nov. 1, 2022, 6 pages (3 pages of English Translation and 3 pages of Original copy); Korean Patent Office.

Bhuyan et al. "Ultrafast Bessel beams for high aspect ratio taper free micromachining of glass" Proc. of SPIE vol. 7728 77281V-1, Apr. 30, 2010, pp. 1-8.

Chinese Patent Application No. 201880034479.7, Office Action, dated Feb. 24, 2023, 5 pages Chinese Patent Office.

Durnin. "Exact solutions for nondiffracting beams I. The scaler theory" J. Opt. Soc. Am. A. 4(4), Apr. 1, 1987, pp. 651-654.

Kruger et al., "Structuring of dielectric and metallic materials with ultrashort laser pulses between 20 fs and 3 ps"; SPIE vol. 2991, 0277-786X/97, May 9, 1997, pp. 40-47.

METHOD AND SYSTEM FOR MEASURING GEOMETRIC PARAMETERS OF THROUGH HOLES

CROSS-REFERENCE TO RELATED APPLICATIONS

This application is a continuation of and claims the benefit of priority under 35 U.S.C. § 120 of U.S. patent application Ser. No. 15/632,919, filed on Jun. 26, 2017, which claims the benefit of priority under 35 U.S.C. § 119 of U.S. Provisional Application Ser. No. 62/356,091 filed on Jun. 29, 2016, the content of which is relied upon and incorporated herein by reference in its entirety.

FIELD

The present disclosure relates to measurement of geometric parameters of through holes in substrates.

BACKGROUND

Typically, small geometric features with diameters below 100 microns are measured using a microscope or an Optical Coordinate Measuring Machine (OCMM). These systems typically use high optical magnification objective lenses to resolve small features, and because of the small depth of field of the lens, measurements are limited to features on or near the surface of the object. Microscope objective lens are designed to work at specific conjugate points, and their aberration corrections will suffer significantly if they are used at other distances, resulting in a distorted image. Commonly, object depth or shape information can be acquired using scanning electron microscopy or 3D confocal microscopy, but these methods are destructive and slow and cannot be used to inspect thousands of features quickly.

SUMMARY

A method and system for measuring geometric parameters of through holes in thin substrates are disclosed herein. The method is non-destructive, and the method and system can be automated to provide inspection of hundreds to thousands of holes in a matter of minutes. The method and system can be used to measure geometric parameters, such as clear aperture size and the like, of all types of hole profiles, such as straight, tapered, hour glass, and the like. The term "clear aperture" refers to the clear unobstructed opening of a hole when looking through the hole under normal incidence. For a straight hole, where the diameter of the hole is uniform, the clear aperture size is the same as the diameter of the hole. For other types of holes, such as a hour glass hole or tapered hole, the clear aperture size is defined by the minimum transverse dimension of the hole. The minimum transverse dimension would be located at the narrowest point, or waist, of the hole. The method and system can measure the clear aperture size of every hole, independent of the depth at which the clear aperture occurs. Even if the clear aperture size and depth show large variations across a substrate, the method and system will not require any adjustments or refocusing during the measurement.

In a first aspect, a method of measuring geometric parameters of through holes in a substrate includes positioning a camera comprising an image sensor and a lens having a depth of field greater than the thickness of the substrate at a measuring station. The method includes positioning a select sub-volume of the substrate within a field of view of the camera and within the depth of range. The method includes illuminating the select sub-volume. The method includes capturing an image of the select sub-volume on the image sensor and processing the image to determine at least one geometric parameter of at least one through hole in the select sub-volume.

A second aspect of this disclosure includes the method as described in the first aspect, where the at least one geometric parameter is a clear aperture size of the at least one through hole.

A third aspect of this disclosure includes the method as described in the first or second aspect, where the substrate has a thickness of 1 mm or less.

A fourth aspect of this disclosure includes the method as described in any of the first to the third aspects, wherein the lens is a telecentric lens.

A fifth aspect of this disclosure includes the method as described in the fourth aspect, wherein the illuminating the select sub-volume comprises using collimated light.

A sixth aspect of this disclosure includes the method as described in any one of the first to the fifth aspects, where the select sub-volume has a front side and a back side, the front side is positioned in opposing relation to the lens, and the select sub-volume is illuminated by directing light at the front side of the select sub-volume.

A seventh aspect of this disclosure includes the method as described in the fifth aspect, where the light is directed at the front side of the select sub-volume by passing the light through the telecentric lens to the front side of the select sub-volume.

An eighth aspect of this disclosure includes the method as described in the fourth or fifth aspect, where illuminating the select sub-volume further includes reflecting the light into the select sub-volume using a mirror mounted at the back side of the select sub-volume.

A ninth aspect of this disclosure includes the method as described in any one of the first to the fifth aspects, where the select sub-volume has a front side and a back side, the front side is positioned in opposing relation to the lens, and the select sub-volume is illuminated by directing light at the back side of the select sub-volume.

A tenth aspect of this disclosure includes the method as described in any one of the first to the ninth aspects. The tenth aspect further includes effecting a relative motion between the camera and the substrate to position a new sub-volume of the substrate within the field of view of the camera and within the depth of field.

An eleventh aspect of this disclosure includes the method as described in the tenth aspect. The eleventh aspect further includes illuminating the new sub-volume with the light, capturing an image of the new sub-volume on the image sensor, and processing the image of the new sub-volume to determine at least one geometric parameter of at least one through hole in the new sub-volume.

A twelfth aspect of this disclosure includes the method as described in the eleventh aspect, where illuminating the new sub-volume includes effecting a relative motion between a source of the light and the substrate such that the new sub-volume is within an illumination volume of the light.

A thirteenth aspect of this disclosure includes the method as described in any one of the first to the twelfth aspects, where processing the image includes detecting changes in contrast in the image.

In a fourteenth aspect, a system of measuring geometric parameters of through holes in a substrate includes a camera comprising an image sensor and a lens having a depth of field greater than a thickness of the substrate. The camera is positioned relative to the substrate such that a select sub-volume of the substrate is within a field of view of the camera and within the depth of field. The system includes a lighting arrangement for illuminating the select sub-volume. The system further includes a processor configured to receive image data from the camera and determine from the image data at least one geometric parameter of at least one through hole in the select sub-volume.

A fifteenth aspect of this disclosure includes the system as described in the fourteenth aspect, wherein the lens is a telecentric lens.

A sixteenth aspect of this disclosure includes the system as described in the fourteenth or fifteenth aspect, wherein the lighting arrangement is a collimated lighting arrangement.

A seventeenth aspect of this disclosure includes the system as described in any one of the fourteenth to sixteenth aspects, where the select sub-volume has a front side and a back side, where the front side is in opposing relation relative to the lens, and where the lighting arrangement includes a light source positioned to direct a light beam at the back side of the select sub-volume.

An eighteenth aspect of this disclosure includes the system as described in any one of the twelfth to sixteenth aspects, where the select sub-volume has a front side and a back side, where the front side is in opposing relation to the lens, and where the lighting arrangement includes a coaxial light source optically coupled to the lens.

A nineteenth aspect of this disclosure includes the system as described in the eighteenth aspect, where the lighting arrangement further includes a mirror mounted in contact with a backside of the select sub-volume.

A twentieth aspect of this disclosure includes the system as described in the nineteenth aspect, where the mirror extends across a back side of the substrate including the back side of the select sub-volume.

A twenty-first aspect of this disclosure includes the system as described in any one of the fourteenth to the twentieth aspects. The twenty-first aspect further includes a translation mechanism coupled to the substrate and operable to translate the substrate relative to the camera.

A twenty-second aspect of this disclosure includes the system as described in any one of the fourteenth to the twenty-first aspects, where the processor is configured to determine a clear aperture size of the at least one through hole from the image data.

BRIEF DESCRIPTION OF DRAWINGS

The following is a description of the figures in the accompanying drawings. The figures are not necessarily to scale, and certain figures and certain views of the figures may be shown exaggerated in scale or in schematic in the interest of clarity and conciseness.

DETAILED DESCRIPTION

Figure 1A:
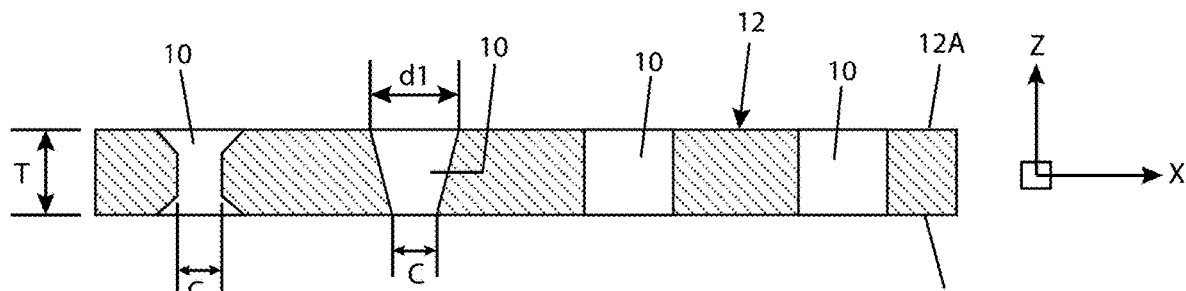
FIG. 1A is a cross-section of an example substrate having through holes.
Figure 1B:
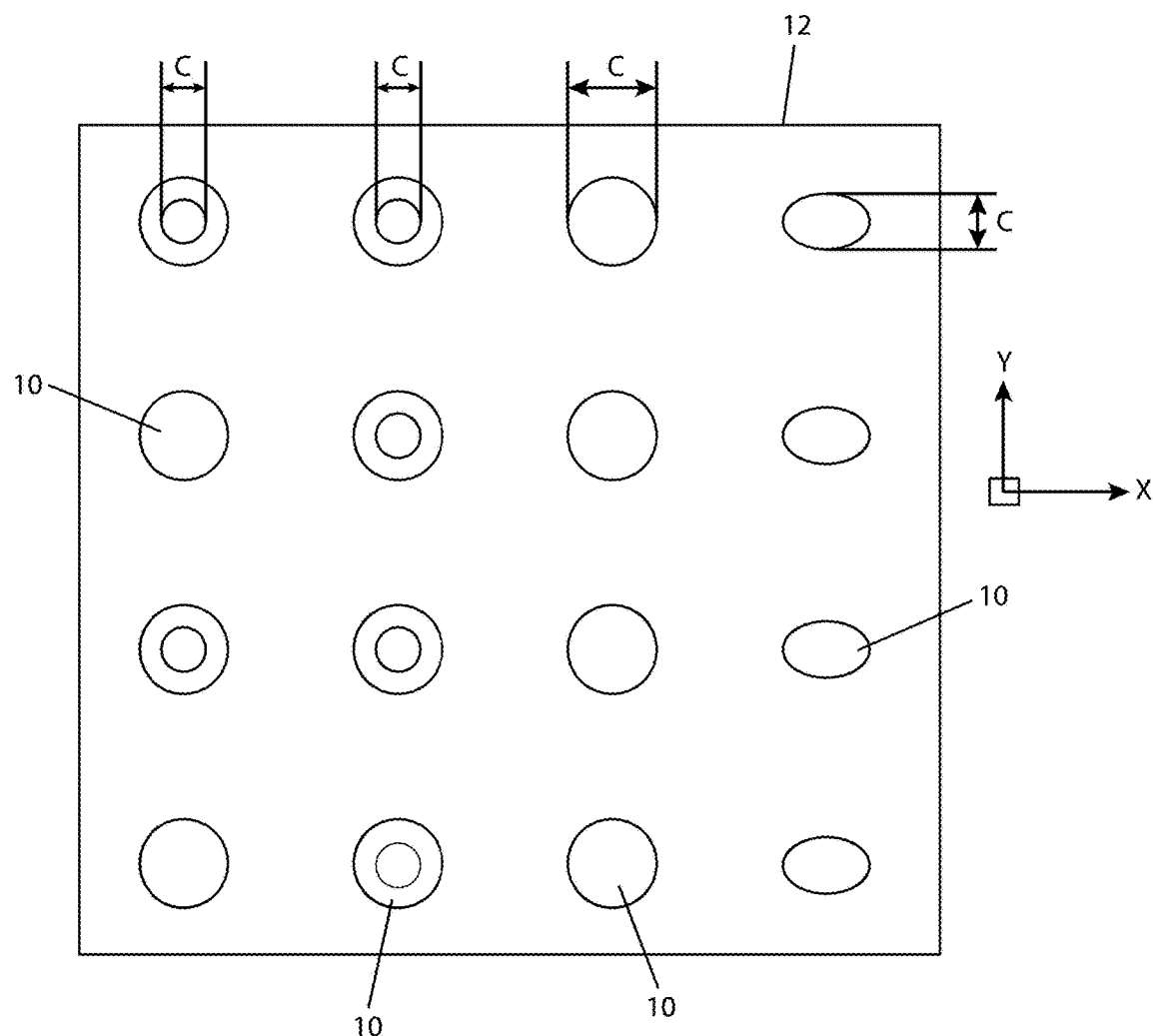
FIG. 1B is a top view of the substrate shown in FIG. 1A.

To provide a context for the method and system disclosed herein, FIGS. 1A and 1B illustrate geometric parameters of example through holes 10 formed in an example substrate 12. The through holes 10 are holes that run along the thickness (T) of the substrate 12 or from the front side 12A of the substrate 12 to the back side 12B of the substrate 12. Along the thickness (T) of the substrate 12, i.e., along the Z axis, the through holes 10 may have any desired shape, such as straight, tapered, or hourglass. In the plane of the substrate 12, i.e., in the XY plane, the through holes 10 may have any desired cross-sectional shape, such as circular, square, or elliptical. One of the hole geometric parameters that may be measured is clear aperture size. The clear aperture of a through hole is the aperture of the path through the through hole where light can travel unobstructed. The clear aperture size of a through hole 10 may be defined as the minimum distance diameter, or minimum transverse dimension, (C) of the through hole 10. Examples of other hole geometric parameters that may be measured are maximum diameter (d1) of the through hole 10, average diameter of the through hole 10, aspect ratio of the through hole 10, and direction of a major axis of the through hole 10.

Figure 2A:
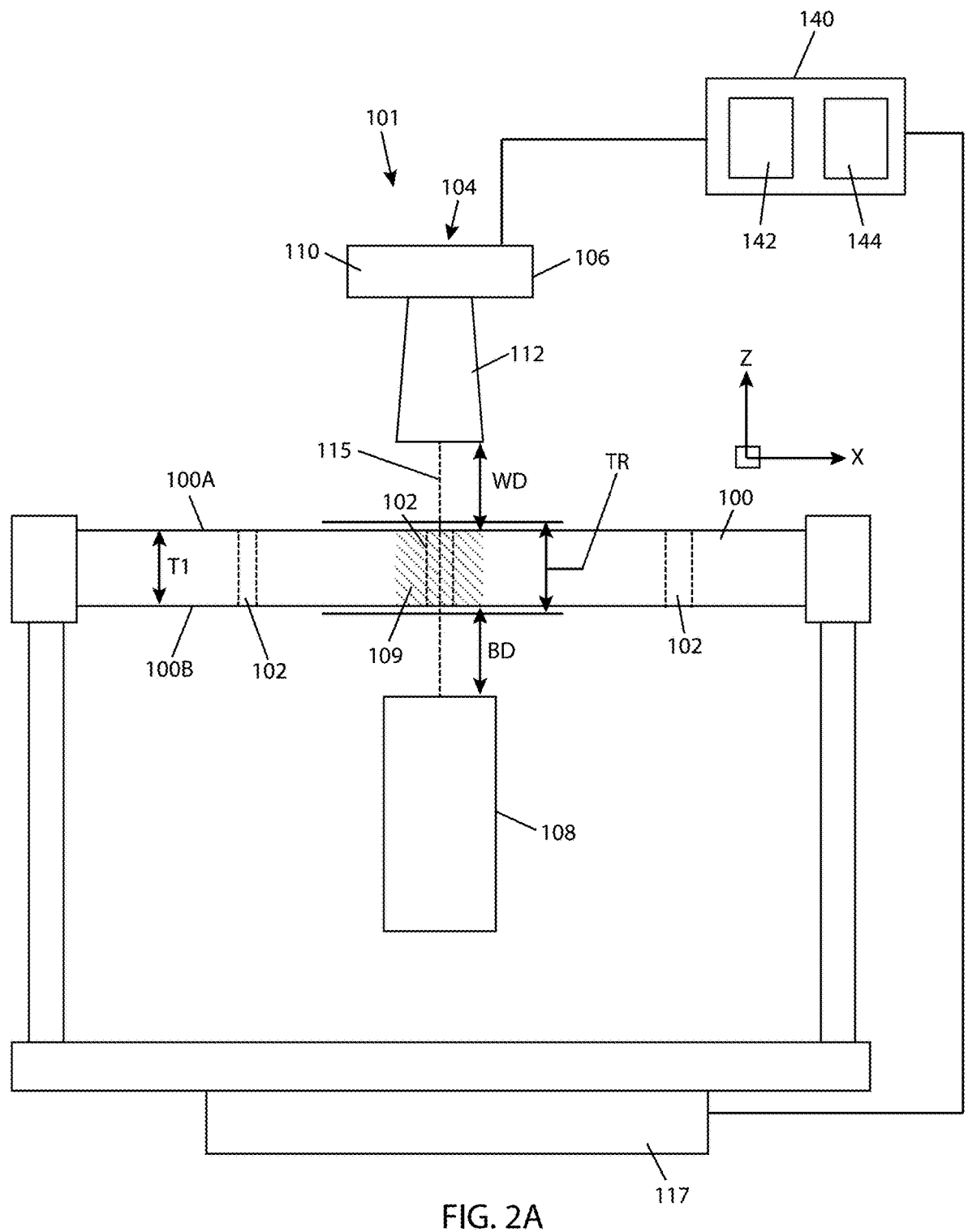
FIG. 2A is a diagram of a system for measuring geometric parameters of through holes in a substrate.

FIG. 2A shows a measurement system 101 including an imaging apparatus 104 for acquiring images of through holes in a substrate according to one embodiment. The images acquired by the imaging apparatus 104 can be processed to determine any of the hole geometric parameters discussed above. For illustration purposes, FIG. 2A shows a sample substrate 100 having through holes 102 and a thickness T1, which is also the depth of the through holes 102. Although only a few through holes 102 are shown in the substrate 100, more commonly, a sample substrate will have numerous through holes, e.g., ranging from tens to thousands of holes. The measurement system 101 is not limited to any number of through holes in the substrate 100. Although the through holes 102 are shown as straight holes having a circular cross-section (see FIG. 2B), the measurement system of 101 is also not limited to any particular shape of through holes or orientation of through holes in the substrate. The through holes in the substrate 100 may have any of the shapes discussed above and other shapes not specifically mentioned above. In one embodiment, the substrate 100 is a thin substrate having a thickness of 1 mm or less, although the thickness of the substrate will generally only be limited by the depth of field of the imaging apparatus 104. In FIG. 2A, the through holes 102 are exaggerated in size (diameter) relative to the field of view of the imaging apparatus 104. For most applications justifying the cost of the measurement system, the through holes 102 in the sample substrate 100 will typically be micron-sized, although the size of the through holes 102 will generally only be limited by the field of view and the resolution of the imaging apparatus 104.

In one embodiment, the imaging apparatus 104 includes a camera 106 and a backlight illuminator 108 arranged on opposite sides of the substrate 100, and particularly on opposite sides of a target sub-volume 109 of the substrate 100. The target sub-volume 109 includes one or more through holes 102 whose geometric parameters are to be measured. In one embodiment, the camera 106 includes an image sensor 110 and an objective lens 112 optically coupled to the image sensor 110. In one embodiment, the image sensor 110 has a pixel count of at least 10 megapixels (MP), allowing the camera 106 to capture high resolution images. However, the size of the image sensor 110 will generally be dictated by the desired accuracy of the measurement. For example, if a 100 micron geometric feature is to be measured with 1 micron accuracy, the image pixel size should be close to 1 micron. Image pixel size is a function of the physical size of the image sensor pixel and the magnification of the objective lens. In some embodiments, the objective lens 112 is a telecentric lens. Reasons for selecting a telecentric lens as the objective lens 112 are discussed below.

Conventional lenses have angular fields of view, which means that as the distance between the lens and object increases, the magnification decreases. This angular field of view results in parallax error, also known as perspective error. Telecentric lenses eliminate this parallax error by having a constant, non-angular field of view. With telecentric lenses, magnification remains constant with object displacement, provided the object stays within the telecentric range. The term "telecentric range" or "telecentric depth" or "depth of field (DOF)", as used with telecentric lenses, refers to the total distance above and below an object that remains in focus and at constant magnification. Telecentric range may be defined as a range of axial displacements causing a variation in image size of less than 1 micron. The telecentric range (or telecentric depth or DOF) of a telecentric lens can be obtained from the lens manufacturer or may be included in the specification of the telecentric lens.

By using a telecentric lens as the objective lens 112, according to one embodiment, virtually distortion free images can be acquired and used to accurately determine the desired geometric parameters of the through holes in the substrate 100. In one embodiment, the telecentric objective lens 112 has a telecentric range (TR in FIG. 2A), that is greater than the thickness T1 of the substrate 100. A procedure for selecting the telecentric objective lens 112 may include finding telecentric lenses from commercial sources (for example Opto Engineering) that meet the telecentric range requirement stated above. From this set of telecentric lenses, the telecentric lens with the highest magnification can be selected for use as the telecentric objective lens 112. For measurement of hole geometric parameters using the selected telecentric lens, the working distance WD, which is the distance between the front surface of the telecentric lens 112 and the front surface 100A of the substrate 100, is adjusted such that the target sub-volume 109 of the substrate 100 lies entirely within the telecentric range. The manufacturer's specification for the telecentric lens will typically include the working distance for the selected magnification and telecentric range (or DOF or telecentric depth).

In one embodiment, the backlight illuminator 108 is used to produce a sharp silhouetted image of the holes to be measured. For the telecentric lens 112, the backlight illuminator 108 can be a telecentric illuminator, which is a collimated illuminator that is designed to work specifically with telecentric lenses. Telecentric illuminators are available commercially (for example, from Opto Engineering). The telecentric illuminator 108 will uniformly illuminate the target sub-volume 109 of the substrate 100 with a collimated light beam. The illumination volume must be the size of the target sub-volume 109 or bigger to assure illumination of the entire field of view. For the arrangement shown in FIG. 2A, the optical axes of the backlight illuminator 108 and telecentric lens 112 are aligned. The distance BD of the backlight illuminator 108 from the back surface 100B of the substrate 100 may be selected to achieve a desired illumination of the target sub-volume 109 of the substrate 100.

Figure 3:
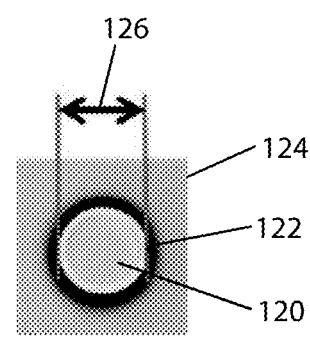
FIG. 3 is an image of a hole acquired by the method of FIG. 1.

FIG. 3 shows an example of a silhouetted image, where the through hole in the target sub-volume appears as a light spot 120 surrounded by a dark ring 122 in a transparent substrate 124. The dark ring 122 is the superimposed area of sidewalls as seen when looking into the hole. The more the sidewalls are tapered and distinctly different from a cylinder, the thicker the dark ring will appear in the image. For a straight hole, the diameter 126 of the light spot 120 will indicate the clear aperture size of the hole. The clear aperture size can be measured by counting the pixels corresponding to the diameter 126.

Figure 4:
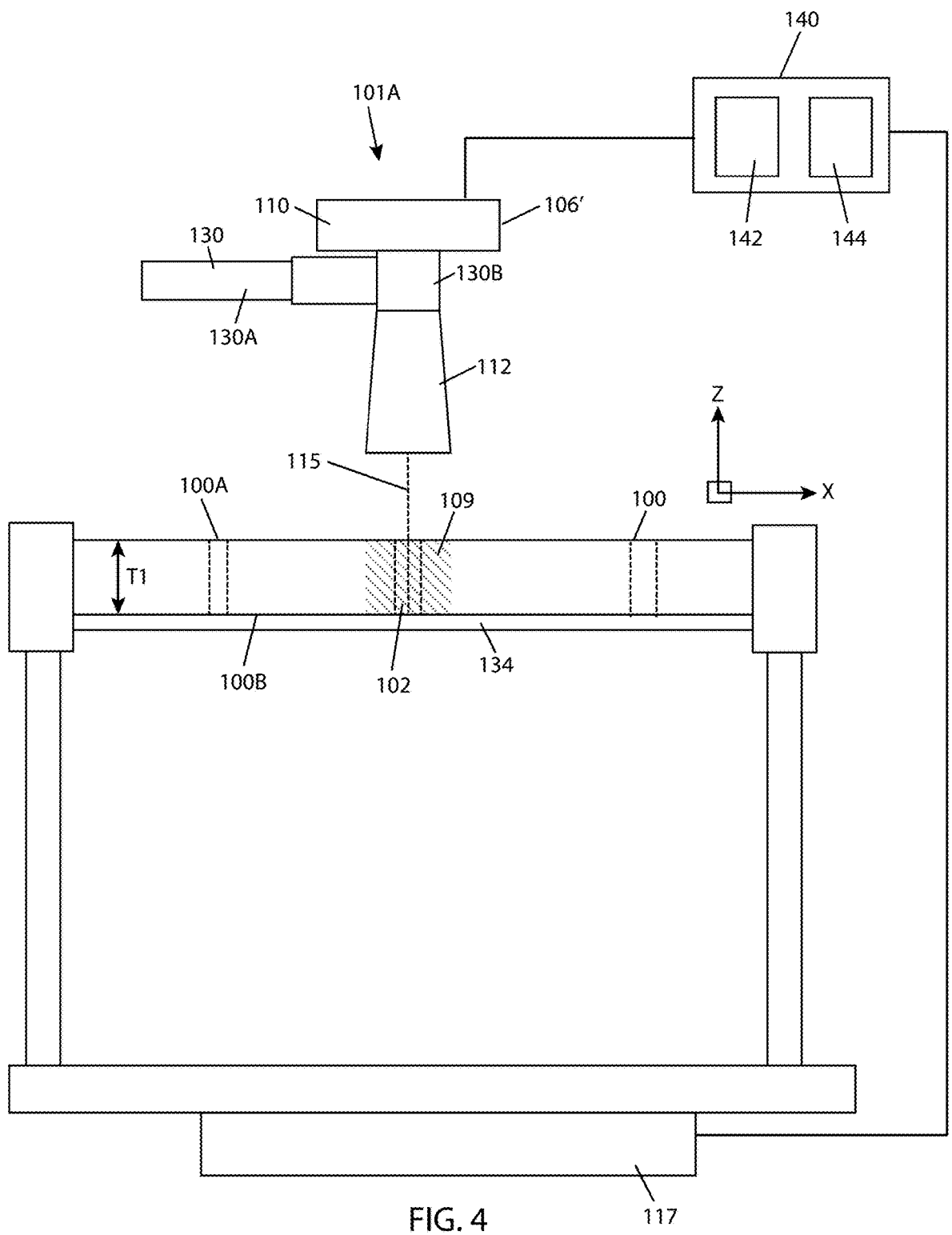
FIG. 4 is a diagram of another system for measuring geometric parameters of through holes in a substrate.

FIG. 4 shows a modified system 101A including a different lighting arrangement that may be used with the telecentric lens 112. The different lighting arrangement includes a coaxial light source 130 arranged on the same side of the substrate 100 as the camera 106'. The coaxial light source 130 may include a light source 130A and optics module 130B for aligning the light from the light source 130A in a direction generally parallel to the optical axis 115 of the telecentric lens 112. For example, the optics module 130B may include a beam splitter. The optics module 130B may be arranged in line with the telecentric lens 112 and image sensor 110, as shown in FIG. 4. The different lighting arrangement may further include a mirror 134 arranged in contact with the back surface 100B of the substrate 100. The mirror 134 will reflect the light from the optics module 130B into the target sub-volume 109 of the substrate 100 to be measured. The mirror 134 may extend across the back surface 100B of the substrate 100 and may be movable with the substrate 100 as a unit.

Both the lighting arrangements shown in FIGS. 2A and 4 can be used when measuring through hole parameters in transparent substrates such as glass. Both the lighting arrangements shown in FIGS. 2A and 4 are also suitable for use with opaque substrates. However, the lighting arrangement shown in FIG. 2A may work better for opaque substrates due to its higher contrast. The lighting arrangement shown in FIG. 4 has an advantage when there is no access to the back side of the substrate, such as when the substrate sits in a solid chuck, or when there is insufficient room behind the back side of the substrate to put the backlight illuminator.

Figure 2B:
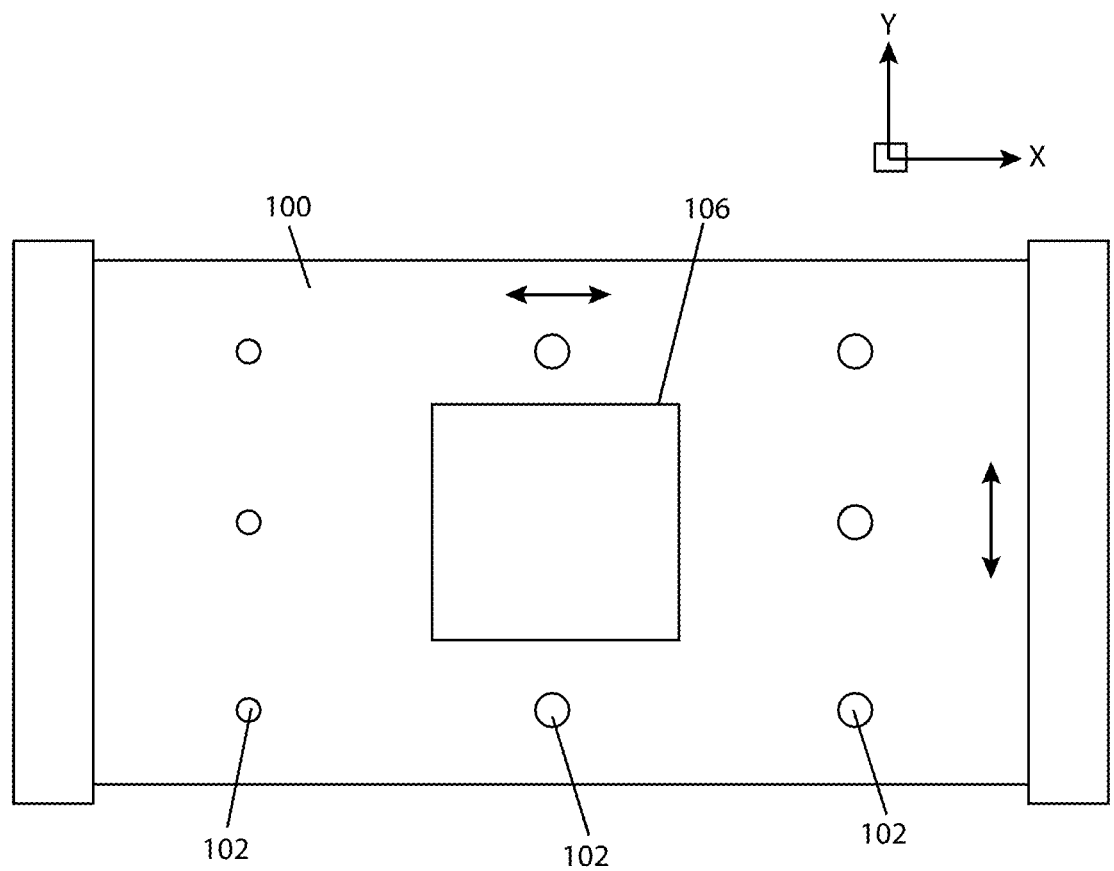
FIG. 2B is a top view of the system shown in FIG. 2A.

Returning to FIG. 2A, the field of view of the camera 106 (106' in FIG. 4) is limited to the diameter of the front surface of the telecentric lens 112 (i.e., the surface of the lens in opposed relation to the substrate 100). The field of view of the camera 106 (106' in FIG. 4) and the telecentric range of the telecentric lens 112 define the target sub-volume of the substrate whose image is acquired at any moment. However, scanning of the substrate will allow all the holes in the substrate or all the holes within a desired volume of the substrate to be measured. Scanning involves providing relative motion between the substrate 100 and the imaging apparatus 104. In one embodiment, the camera 106 and backlight illuminator 108 (or camera 106' and coaxial light source 130 in the embodiment of FIG. 4) may be held in fixed positions while the substrate 100 is translated in a plane perpendicular to the optical axis 115 of the camera 106 (i.e., the XY plane as shown in FIG. 2B). This will allow different sub-volumes of the substrate 100 to be moved into the field of view of the camera 106 over the scanning period. A translation stage 117 may be coupled to the substrate 100 and operated to translate the substrate 100 in the desired directions or plane. It is also possible to hold the substrate 100 fixed while translating the camera 106 and backlight illuminator 108 (or camera 106' and coaxial light source 130 in the embodiment of FIG. 4) relative to the substrate 100.

A controller 140 may be coupled to the camera 106 (106' in FIG. 4) to receive image data from the camera 106. The controller 140 may include a memory device 142 for storing the received image data and a processor 144 for processing the image data. The processor 144 may be configured to process the image data to determine one or more geometric parameters, such as clear aperture size, of through holes represented in the image data. The processor 144 may run a commercially available image processing software capable of analyzing the image data and extracting the desired geometric parameters from the image data. Examples of suitable commercial image processing software packages include, but are not limited to, HALCON by MVTec Software GmbH, MATLAB by MathWorks, Matrox Inspector with Matrox Imaging Library by Matrox, and NI Vision by National Instrument. The measured geometric parameters may be stored in the memory device 142 or other suitable storage device for later use. The controller 140 may also control translation of the substrate 100 during scanning of the substrate 100. For example, after processing the image data acquired by the camera 106 (106' in FIG. 4) for a current target sub-volume, the processor 144 may issue a command to the translation stage 117 to move the next target sub-volume into the field of view of the camera 106 (camera 106' for the embodiment in FIG. 4).

Table 1 below shows examples of telecentric lens options for acquiring images of through holes in thin substrates.

TABLE 1

| Option | Lens Magnification | Telecentric range or DOF (mm) | Camera Array | Field of View (mm) | Pixel Size (microns) |
|---|---|---|---|---|---|
| 1 | 1X | 0.9 | 3840 × 2748 | 6.4 × 4.8 | 1.7 |
| 2 | 1.33X | 0.5 | 3840 × 2748 | 4.8 × 3.6 | 1.3 |
| 3 | 2X | 0.2 | 3840 × 2748 | 3.2 × 2.4 | 0.85 |

Figure 5A:
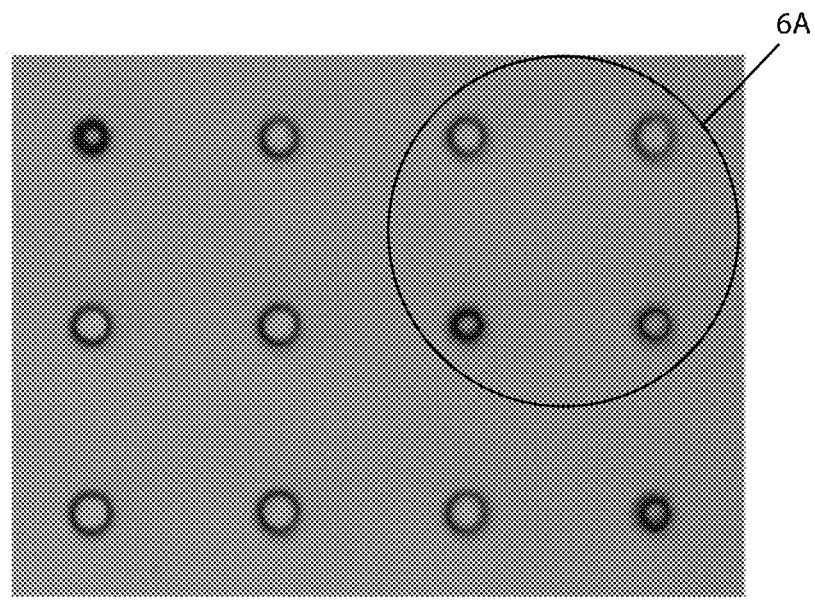
FIG. 5A is an image of a select sub-volume of a substrate acquired without using telecentric optics.
Figure 5B:
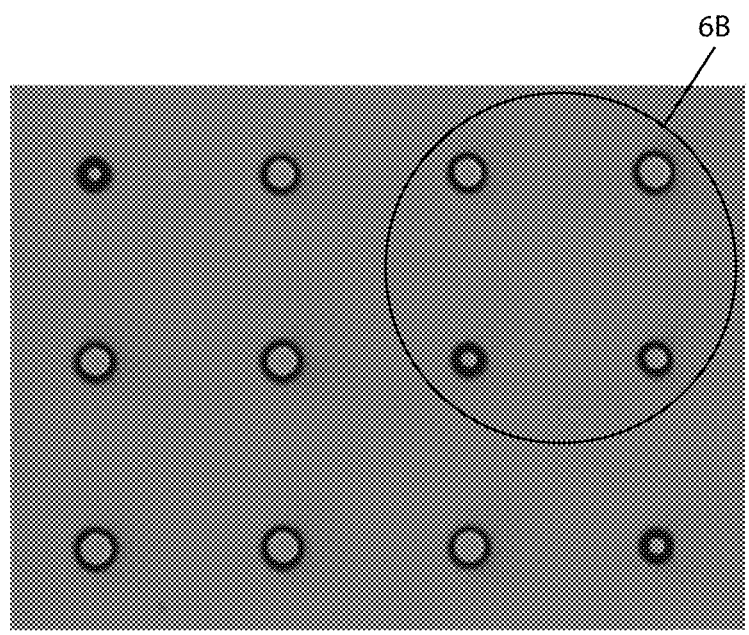
FIG. 5B is an image of a select sub-volume of a substrate acquired with use of telecentric optics.
Figure 6A:
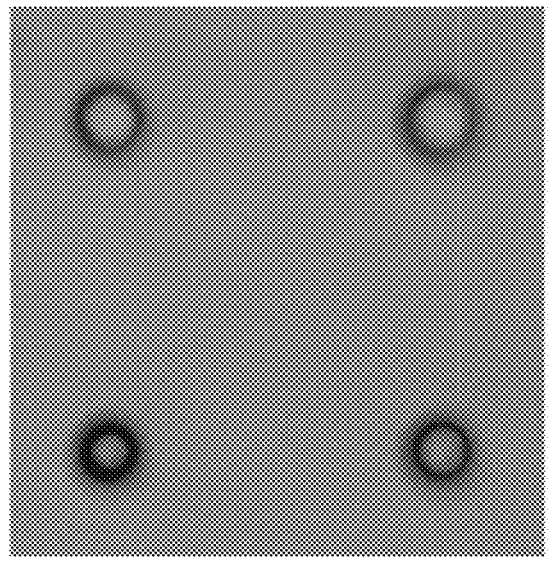
FIG. 6A is a close-up view of section 6A of FIG. 5A.
Figure 6B:
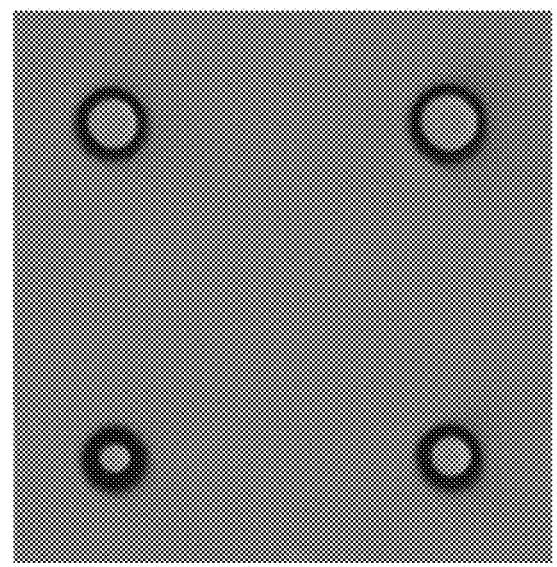
FIG. 6B is a close-up view of section 6B of FIG. 5B.

FIG. 5A shows an image of 3×4 holes acquired with VIEW Summit 650 Optical Coordinate Measuring Machine (OCMM). FIG. 5B shows an image of 3×4 holes acquired with a 10 megapixels camera using telecentric optics as listed in Option 1 in Table 1. Both images in FIGS. 5A and 5B were taken at 1X optical magnification with green backlighting. For the image in FIG. 5B, the backlight was a telecentric (i.e., collimated) light source. FIG. 6A shows a zoomed-in view of four of the holes in FIG. 5A. FIG. 6B shows a zoomed-in view of four of the holes in FIG. 5B. The image in FIG. 6B, which was acquired with telecentric optics, shows a much more defined outline of the holes than the image in FIG. 6A, which was acquired with the OCMM. The much smaller depth of field in the OCMM measurement system used to acquire the image of FIG. 6A prevented waists at different depths from being in focus simultaneously.

A procedure for measuring one or more geometric parameters of through holes in a substrate may include selecting the lens objective for a particular substrate thickness. Examples of lens objectives are given in Table 1. After the lens objective has been selected, the desired geometric parameters, such as clear aperture size, of holes in the substrate can be measured quickly in a few simple steps, as outlined below.

The substrate is moved in between the backlight illuminator 108 and the camera 106 for the system shown in FIG. 2A (or beneath the coaxial light source 130 and camera 106' for the system shown in FIG. 4) to position a target sub-volume of the substrate in the field of view of the camera.

The target sub-volume is illuminated, and an image of the illuminated target sub-volume is acquired.

The acquired image is processed to determine at least one geometric parameter of each through hole in the target sub-volume. Processing involves detecting changes in light levels, or contrast, in the acquired image. Changes in contrast can define boundaries, or lines, within the image. These lines can be extended to create objects like segments, circles, ellipses, and the like, and then parameters such as diameter or distance can be extracted. The acquired image is typically processed on a computer using commercially available image analysis software. Examples of suitable commercial imaging processing software packages include, but are not limited to, HALCON by MVTec Software GmbH, MATLAB by MathWorks, Matrox Inspector with Matrox Imaging Library by Matrox, and NI Vision by National Instrument.

The geometric parameter values for each hole are recorded. The acquired image may be discarded after recording the geometric parameter values to save storage space since the high-resolution images can be quite large.

The substrate is then translated relative to the camera and lighting arrangement to place another target sub-volume of the substrate in the field of view of the camera and within the illumination volume provided by the lighting arrangement. The acquiring of the image of the target sub-volume, processing of the image, and recording of geometric parameter values for each hole in the target sub-volume are repeated for the new target sub-volume.

The procedure described above can be automated to scan an entire substrate or a small area within the substrate. The duration of a measurement run is determined predominantly by how fast the substrate can be translated and how fast the images can be acquired and processed and not by the number of holes in the field of view. A substrate with holes ranging from hundreds to thousands can be quickly measured using an automated procedure and any of the setups described in FIGS. 2A and 4. In some embodiments, multiple cameras 106, 106' may be utilized to increase the speed of scanning the substrate. In some embodiments, multiple illuminator 108 may be used in conjunction with the multiple cameras. In some embodiments, there may be constant relative movement between the substrate and cameras 106, 106' and illuminator 108 or light source 130 may turn on and off (e.g., strobe) at regular intervals for cameras 106, 106' to take images.

While the invention has been described with respect to a limited number of embodiments, those skilled in the art of, having benefit of this disclosure, will appreciate that other embodiments can be devised which do not depart from the scope of the invention as disclosed herein. Accordingly, the scope of the invention should be limited only by the accompanying claims.

The invention claimed is:
1. A method of measuring geometric parameters of through holes in a substrate, comprising:
positioning a camera comprising an image sensor and a lens having a depth of field greater than a thickness of the substrate at a measuring station, the image sensor having a pixel count of at least 10 megapixels and a pixel size of 1.7 microns or less;

positioning a select sub-volume of the substrate within a field of view of the camera and within the depth of field, the select sub-volume having a front side, a back side, and at least one through hole, and the at least one through hole having a first side at the front side of the select sub-volume and a second at the back side of the select sub-volume;

illuminating the select sub-volume with a light source;

capturing an image of the select sub-volume on the image sensor; and processing the image to determine at least a minimum transverse dimension of the at least one through hole along a length of the through hole, the minimum transverse dimension of the through hole being between the first side and the second side of the through hole, wherein the light source and the camera are arranged on a same side of the substrate.

2. The method of claim 1, wherein illuminating the select sub-volume with the light source further comprises reflecting light from the light source into the select sub-volume using a mirror.

3. The method of claim 2, further comprising moving the mirror with the substrate.

4. The method of claim 2, wherein the light source and the camera are disposed on the front side of the select sub-volume and the mirror is disposed on the on a back side of the select sub-volume.

5. The method of claim 1, wherein the light source is a coaxial light source.

6. The method of claim 1, wherein the substrate has a thickness of 1 mm or less.

7. The method of claim 1, wherein the lens is a telecentric lens.

8. The method of claim 1, further comprising effecting a lateral relative motion between the camera and the substrate to position another sub-volume of the substrate within the field of view of the camera and within the depth of field.

9. The method of claim 8, further comprising illuminating the another sub-volume with light, capturing an image of the another sub-volume on the image sensor, and processing the image of the another sub-volume to determine at least one geometric parameter of at least one hole in the another sub-volume.

10. The method of claim 9, wherein illuminating the another sub-volume comprises effecting a lateral relative motion between the light source and the substrate such that the another sub-volume is within an illumination volume of the light.

11. The method of claim 1, wherein processing the image comprises detecting changes in contrast in the image.

12. A system for measuring geometric parameters of through holes in a substrate, comprising:

a camera comprising an image sensor and a lens having a depth of field greater than a thickness of the substrate, the image sensor having a pixel count of at least 10 megapixels and a pixel size of 1.7 microns or less, and the camera positioned at a select working distance relative to the substrate such that a select sub-volume of the substrate is within a field of view of the camera and within the depth of field, the select-sub volume having a front side, a back side, and at least one through hole, and the at least one through hole having a first side at the front side of the select sub-volume and a second at the back side of the select sub-volume;

a light source for illuminating the select sub-volume; and a processor configured to receive image data from the camera and determine from the image data at least a minimum transverse dimension of the least one through hole along a length of the through hole, the minimum transverse dimension of the through hole being between the first side and the second side of the through hole, wherein the light source and the camera are arranged on a same side of the substrate.

13. The system of claim 12, further comprising a mirror configured to reflect light from the light source into the select sub-volume.

14. The system of claim 13, wherein the mirror is moveable with the substrate.

15. The system of claim 13, wherein the light source and the camera are disposed on the front side of the select sub-volume and the mirror is disposed on the back side of the select sub-volume.

16. The system of claim 12, wherein the light source is a coaxial light source.

* * * * *

UNITED STATES PATENT AND TRADEMARK OFFICE
CERTIFICATE OF CORRECTION

PATENT NO. : 11,774,233 B2
APPLICATION NO. : 17/004092
DATED : October 3, 2023
INVENTOR(S) : Uta-Barbara Goers et al.

It is certified that error appears in the above-identified patent and that said Letters Patent is hereby corrected as shown below:

On the Title Page

On the page 8, in item (56), in Column 2, under "Other Publications", Line 10, delete "pluse" and insert -- pulse --.

On the page 8, in item (56), in Column 2, under "Other Publications", Line 19, delete "Tithography,"" and insert -- lithography," --.

On the page 9, in item (56), in Column 1, under "Other Publications", Line 13, delete "micro-achitecture," and insert -- micro-architecture, --.

On the page 9, in item (56), in Column 1, under "Other Publications", Line 27, delete "oflerephthalic" and insert -- terephthalic --.

On the page 9, in item (56), in Column 2, under "Other Publications", Line 49, delete "Proccessing" and insert -- Processing --.

On the page 10, in item (56), in Column 2, under "Other Publications", Line 67, delete "Microelectronis" and insert -- Microelectronics --.

Signed and Sealed this
Twenty-seventh Day of August, 2024

Katherine Kelly Vidal
*Director of the United States Patent and Trademark Office*